(12) United States Patent
Constantz et al.

(10) Patent No.: US 7,829,053 B2
(45) Date of Patent: *Nov. 9, 2010

(54) NON-CEMENTITIOUS COMPOSITIONS COMPRISING $CO_2$ SEQUESTERING ADDITIVES

(75) Inventors: Brent Constantz, Portola Valley, CA (US); Andrew Youngs, Los Gatos, CA (US); Joshua Patterson, Freedom, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,491

(22) Filed: Oct. 30, 2009

(65) Prior Publication Data

US 2010/0111810 A1    May 6, 2010

Related U.S. Application Data

(60) Provisional application No. 61/110,495, filed on Oct. 31, 2008, provisional application No. 61/149,949, filed on Feb. 4, 2009, provisional application No. 61/181,250, filed on May 26, 2009.

(51) Int. Cl.
*C01F 5/24* (2006.01)
*C01F 11/18* (2006.01)
*C01F 1/00* (2006.01)
*C01B 31/24* (2006.01)
*G01N 33/24* (2006.01)
*G01N 33/00* (2006.01)

(52) U.S. Cl. .................. 423/430; 423/158; 423/165; 423/419.1; 436/29; 436/145; 73/866

(58) Field of Classification Search .............. 423/419.1, 423/430, 158, 165; 436/29, 145; 73/866
See application file for complete search history.

(56) References Cited

U.S. PATENT DOCUMENTS

| | | | |
|---|---|---|---|
| 1,678,345 | A | 7/1928 | Mattison |
| 1,865,833 | A | 7/1928 | Mattison |
| 1,897,725 | A | 2/1933 | Gaus et al. |
| 2,329,940 | A | 9/1943 | Ponzer |
| 2,383,674 | A | 8/1945 | Osborne |
| 2,606,839 | A | 8/1952 | Evans |
| 2,934,419 | A | 4/1960 | Cook |
| 2,967,807 | A | 1/1961 | Osborne et al. |

(Continued)

FOREIGN PATENT DOCUMENTS

AU    2007100157    4/2007

(Continued)

OTHER PUBLICATIONS

Aker, "Aker Clean Carbon, Carbon Capture Solutions Provider" Aker Clean Carbon Presentation for UN's IPCC; Jan. 24, 2008; 8pp.

(Continued)

*Primary Examiner*—Timothy C Vanoy
*Assistant Examiner*—Daniel Berns

(57) ABSTRACT

Non-cementitious $CO_2$ sequestering compositions are provided. The compositions of the invention include a $CO_2$ sequestering additive, e.g., a $CO_2$ sequestering carbonate composition. Additional aspects of the invention include methods of making and using the non-cementitious $CO_2$ sequestering compositions.

9 Claims, 1 Drawing Sheet

U.S. PATENT DOCUMENTS

| | | |
|---|---|---|
| 3,046,152 A | 7/1962 | Tsuneyoshi |
| 3,179,579 A | 4/1965 | Gustave et al. |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,574,530 A | 4/1971 | Suriani et al. |
| 3,627,479 A | 12/1971 | Yee |
| 3,725,267 A | 4/1973 | Gelblum |
| 3,864,236 A | 2/1975 | Lindstrom |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 4,026,716 A | 5/1977 | Urschel, III et al. |
| 4,036,749 A | 7/1977 | Anderson |
| 4,080,270 A | 3/1978 | O'Leary et al. |
| 4,107,022 A | 8/1978 | Strempel et al. |
| 4,128,462 A | 12/1978 | Ghiringhelli et al. |
| 4,140,510 A | 2/1979 | Scholze et al. |
| 4,147,599 A | 4/1979 | O'Leary et al. |
| 4,188,291 A | 2/1980 | Anderson |
| 4,217,186 A | 8/1980 | McRae |
| 4,242,185 A | 12/1980 | McRae |
| 4,264,367 A | 4/1981 | Schutz |
| 4,335,788 A | 6/1982 | Murphey et al. |
| 4,361,475 A | 11/1982 | Moeglich |
| 4,370,307 A | 1/1983 | Judd |
| 4,376,101 A | 3/1983 | Sartori et al. |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,620,969 A | 11/1986 | Wilkinson |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,899,544 A | 2/1990 | Boyd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,230,734 A | 7/1993 | Kumasaka et al. |
| 5,246,551 A | 9/1993 | Pletcher et al. |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,470,671 A | 11/1995 | Fletcher et al. |
| 5,531,821 A | 7/1996 | Wu |
| 5,531,865 A | 7/1996 | Cole |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,702,585 A | 12/1997 | Hillrichs et al. |
| 5,766,339 A | 6/1998 | Babu et al. |
| 5,776,328 A | 7/1998 | Traini et al. |
| 5,785,868 A | 7/1998 | Li et al. |
| 5,846,669 A | 12/1998 | Smotkin et al. |
| 5,853,686 A * | 12/1998 | Doxsee ................. 423/430 |
| 5,855,759 A | 1/1999 | Keating et al. |
| 5,925,255 A | 7/1999 | Mukhopadhyay |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,129,832 A | 10/2000 | Fuhr et al. |
| 6,180,012 B1 | 1/2001 | Rongved |
| 6,190,428 B1 | 2/2001 | Rolison et al. |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,251,356 B1 | 6/2001 | Mathur |
| 6,280,505 B1 | 8/2001 | Torkildsen et al. |
| 6,352,576 B1 | 3/2002 | Spencer et al. |
| 6,375,825 B1 | 4/2002 | Mauldin et al. |
| 6,402,831 B1 | 6/2002 | Sawara et al. |
| 6,444,107 B2 | 9/2002 | Hartel et al. |
| 6,475,460 B2 | 11/2002 | Max |
| 6,495,013 B2 | 12/2002 | Mazur et al. |
| 6,518,217 B2 | 2/2003 | Xing et al. |
| 6,537,456 B2 | 3/2003 | Mukhopadhyay |
| 6,602,630 B1 | 8/2003 | Gopal |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 7,037,434 B2 | 5/2006 | Myers et al. |
| 7,132,090 B2 | 11/2006 | Dziedzic et al. |
| 7,135,604 B2 | 11/2006 | Ding et al. |
| 7,198,722 B2 | 4/2007 | Hussain |
| 7,261,912 B2 | 8/2007 | Zeigler |
| 7,285,166 B2 | 10/2007 | Luke et al. |
| 7,347,896 B2 | 3/2008 | Harrison |
| 7,427,449 B2 | 9/2008 | Delaney et al. |
| 7,440,871 B2 | 10/2008 | McConnell et al. |
| 7,452,449 B2 | 11/2008 | Weinberg et al. |
| 2001/0022952 A1 | 9/2001 | Rau et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0126899 A1 | 7/2003 | Wolken |
| 2003/0188668 A1 | 10/2003 | Bland |
| 2003/0213937 A1 | 11/2003 | Yaniv |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0126293 A1 | 7/2004 | Geerlings et al. |
| 2004/0213705 A1 | 10/2004 | Blencoe et al. |
| 2004/0219090 A1 | 11/2004 | Dziedzic et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0118081 A1 | 6/2005 | Harris et al. |
| 2005/0129606 A1 | 6/2005 | Mitsuhashi et al. |
| 2005/0154669 A1 | 7/2005 | Streetman |
| 2005/0180910 A1 | 8/2005 | Park et al. |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |

| | | | |
|---|---|---|---|
| 2006/0060532 A1 | 3/2006 | Davis | |
| 2006/0105082 A1 | 5/2006 | Zeigler | |
| 2006/0165583 A1 | 7/2006 | Makino et al. | |
| 2006/0169593 A1 | 8/2006 | Xu et al. | |
| 2006/0184445 A1 | 8/2006 | Sandor et al. | |
| 2006/0185516 A1 | 8/2006 | Moriyama et al. | |
| 2006/0185560 A1 | 8/2006 | Ramme et al. | |
| 2006/0185985 A1 | 8/2006 | Jones | |
| 2006/0195002 A1 | 8/2006 | Grandjean et al. | |
| 2006/0196836 A1 | 9/2006 | Arakel et al. | |
| 2006/0288912 A1 | 12/2006 | Sun et al. | |
| 2007/0056487 A1 | 3/2007 | Anthony et al. | |
| 2007/0092427 A1 | 4/2007 | Anthony et al. | |
| 2007/0148509 A1 | 6/2007 | Colbow et al. | |
| 2007/0163443 A1 | 7/2007 | Moriyama et al. | |
| 2007/0186820 A1 | 8/2007 | O'Hearn | |
| 2007/0187247 A1 | 8/2007 | Lackner et al. | |
| 2007/0202032 A1 | 8/2007 | Geerlings et al. | |
| 2007/0212584 A1 | 9/2007 | Chuang | |
| 2007/0217981 A1 | 9/2007 | Van Essendelft | |
| 2007/0240570 A1 | 10/2007 | Jadhav et al. | |
| 2007/0261947 A1 | 11/2007 | Geerlings et al. | |
| 2008/0031801 A1 | 2/2008 | Lackner et al. | |
| 2008/0112868 A1 | 5/2008 | Blencoe et al. | |
| 2008/0138265 A1 | 6/2008 | Lackner et al. | |
| 2008/0171158 A1 | 7/2008 | Maddan | |
| 2008/0223727 A1 | 9/2008 | Oloman et al. | |
| 2008/0236143 A1 | 10/2008 | Lo | |
| 2008/0245274 A1 | 10/2008 | Ramme | |
| 2008/0245660 A1 | 10/2008 | Little et al. | |
| 2008/0245672 A1 | 10/2008 | Little et al. | |
| 2008/0248350 A1 | 10/2008 | Little et al. | |
| 2008/0277319 A1 | 11/2008 | Wystra | |
| 2008/0289495 A1 | 11/2008 | Eisenberger et al. | |
| 2009/0001020 A1 | 1/2009 | Constantz et al. | |
| 2009/0010827 A1 | 1/2009 | Geerlings et al. | |
| 2009/0081093 A1 | 3/2009 | Comrie | |
| 2009/0081096 A1 | 3/2009 | Pellegrin | |
| 2009/0090277 A1 | 4/2009 | Joshi et al. | |
| 2009/0169452 A1 | 7/2009 | Constantz et al. | |
| 2009/0186244 A1 | 7/2009 | Mayer | |
| 2009/0301352 A1 | 12/2009 | Constantz et al. | |
| 2010/0024686 A1* | 2/2010 | Constantz et al. | 106/817 |
| 2010/0077922 A1 | 4/2010 | Constantz et al. | |
| 2010/0111810 A1* | 5/2010 | Constantz et al. | 423/430 |

FOREIGN PATENT DOCUMENTS

| | | | |
|---|---|---|---|
| CA | 1335974 A1 | 6/1995 | |
| DE | 2653649 A1 | 6/1978 | |
| DE | 3146326 A1 | 6/1983 | |
| DE | 36638317 | 6/1987 | |
| DE | 19523324 A1 | 9/1994 | |
| DE | 19631794 A1 | 8/1997 | |
| EP | 0522382 A1 | 1/1993 | |
| EP | 0487102 B1 | 8/1995 | |
| EP | 0591350 B1 | 11/1996 | |
| EP | 0628339 B1 | 9/1999 | |
| EP | 0844905 B1 | 3/2000 | |
| EP | 1379469 B1 | 3/2006 | |
| EP | 1650162 A1 | 4/2006 | |
| EP | 1716911 A1 | 11/2006 | |
| EP | 1554031 B1 | 12/2006 | |
| EP | 1571105 B1 | 12/2007 | |
| GB | 911386 A | 11/1962 | |
| GB | 1392907 | * 5/1975 | |
| GB | 2371810 | 8/2002 | |
| JP | 51102357 A1 | 9/1976 | |
| JP | 59100280 | 6/1984 | |
| JP | 1142093 | 11/1987 | |
| JP | 2003041388 | 2/2003 | |
| WO | WO 93/16216 A1 | 8/1993 | |
| WO | WO 96/34997 A1 | 11/1996 | |
| WO | WO 99/13967 A1 | 3/1999 | |
| WO | WO 01/07365 A1 | 2/2001 | |
| WO | WO 01/96243 A1 | 12/2001 | |
| WO | WO 02/00551 A2 | 1/2002 | |
| WO | WO 03/008071 A1 | 1/2003 | |
| WO | WO 03/054508 A2 | 7/2003 | |
| WO | WO 03/068685 A1 | 8/2003 | |
| WO | WO 2004/041731 A1 | 5/2004 | |
| WO | WO 2004/094043 A2 | 11/2004 | |
| WO | WO 2004/098740 A2 | 11/2004 | |
| WO | WO 2005/078836 A2 | 8/2005 | |
| WO | WO 2005/086843 A2 | 9/2005 | |
| WO | WO 2005/108297 A2 | 11/2005 | |
| WO | WO 2006/009600 A2 | 1/2006 | |
| WO | WO 2006/034339 A1 | 3/2006 | |
| WO | WO 2006/036396 A2 | 4/2006 | |
| WO | WO 2006/134080 A1 | 12/2006 | |
| WO | WO 2007/003013 A1 | 1/2007 | |
| WO | WO 2007/016271 A2 | 2/2007 | |
| WO | WO 2007/060149 A1 | 5/2007 | |
| WO | WO 2007/071633 A1 | 6/2007 | |
| WO | WO 2007/094691 A1 | 8/2007 | |
| WO | WO 2007/096671 A1 | 8/2007 | |
| WO | WO 2007/106372 A2 | 9/2007 | |
| WO | WO 2007/106883 A2 | 9/2007 | |
| WO | WO 2007/123917 A2 | 11/2007 | |
| WO | WO 2007/139392 A1 | 12/2007 | |
| WO | WO 2007/140544 A1 | 12/2007 | |
| WO | WO 2008/018928 A2 | 2/2008 | |
| WO | WO 2008/026201 A2 | 3/2008 | |
| WO | WO 2008/031834 A1 | 3/2008 | |
| WO | WO 2008/061305 A1 | 5/2008 | |
| WO | WO 2008/068322 A1 | 6/2008 | |
| WO | WO 2008/089523 A1 | 7/2008 | |
| WO | WO 2008/095057 A2 | 8/2008 | |
| WO | WO 2008/101293 A1 | 8/2008 | |
| WO | WO 2008/108657 A1 | 9/2008 | |
| WO | WO 2008/115662 A2 | 9/2008 | |
| WO | WO 2008/124538 A1 | 10/2008 | |
| WO | WO 2008/140821 A2 | 11/2008 | |
| WO | WO 2008/142017 A2 | 11/2008 | |
| WO | WO 2008/142025 A2 | 11/2008 | |
| WO | WO 2008/151060 A1 | 12/2008 | |
| WO | WO 2009/006295 A2 | 1/2009 | |
| WO | WO 2009/024826 A1 | 2/2009 | |
| WO | WO 2009/039655 A1 | 4/2009 | |
| WO | WO 2009/065031 A1 | 5/2009 | |
| WO | WO 2009/070273 A1 | 6/2009 | |
| WO | WO 2009/086460 A1 | 7/2009 | |
| WO | WO 2009/146436 A1 | 12/2009 | |

OTHER PUBLICATIONS

Alexander, G. et al., "Evaluation of reaction variables in the dissolution of serpentine for mineral carbonation"; Elsevier; ScienceDirect Fuel 86 (2007) 273-281.

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Cannell, M.G.R. 2003. "Carbon sequestration and biomass energy offset: theoretical, potential and achievable capacities globally, in Europe and the UK." Biomass and Bioenergy. 24: 97-116.

Ciccs "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US2009/056573.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Mazrou, S., et al. 1997. Sodium hydroxide and hydrochloric acid generation from sodium chloride and rock salt by electro-electrodialysis. *Journal of Applied Electrochemistry* 27: 558-567.

Montes-Hernandez, G. et al.,"Mineral sequestration of CO2 by aqueous carbonation of coal combustion fly-ash." Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, A., et al. 2004. CO2 mineral sequestration: physically activated dissolution of serpentine and pH swing process. *Chemical Engineering Science* 59 (22-23): 5241-5247.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Sadhwani et al., "Case Studies on environmental impact of seawater desalination" Science Direct; http://www.sciencedirect.com/science?_ob=ArticleURL&_udi=B6TFX-4HMX97J-3&_u... 3pp, (2005).

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009, Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70: 483-497.

"Electrochemical cell", Wikepedia (2009), http:en.wiipedia.org/wiki/Electrochemical_Cell, Nov. 24, 2009, 5 pp.

International Search Report dated Dec. 14, 2009 of PCT/US09/061748.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.

International Search Report dated Mar. 3, 2010 of EP08867440.3.

International Search Report dated Jan. 4, 2010 of PCT/US09/062795.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

* cited by examiner

US 7,829,053 B2

NON-CEMENTITIOUS COMPOSITIONS COMPRISING $CO_2$ SEQUESTERING ADDITIVES

CROSS-REFERENCE

This application claims the benefit of: U.S. Provisional Application No. 61/110,495, titled "NON-CEMENTITIOUS COMPOSITIONS COMPRISING $CO_2$ SEQUESTERING ADDITIVES," filed 31 Oct. 2008; U.S. Provisional Application No. 61/149,949, titled "NON-CEMENTITIOUS COMPOSITIONS COMPRISING $CO_2$ SEQUESTERING ADDITIVES," filed 4 Feb. 2009; and U.S. Provisional Application No. 61/181,250, titled, "COMPOSITIONS AND METHODS USING SUBSTANCES WITH NEGATIVE DELTA13C VALUES," filed 26 May 2009, which applications are incorporated herein by reference.

BACKGROUND OF THE INVENTION

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 ppm in the 1950s to approximately 380 pmm today, and is expect to exceed 400 ppm in the next decade. The impact of climate change will likely be economically expensive and environmentally hazardous. Reducing potential risks of climate change will require sequestration of atmospheric $CO_2$.

SUMMARY OF THE INVENTION

In some embodiments, the invention provides a non-cementitious composition that includes a $CO_2$ sequestering additive, in which the $CO_2$ sequestering additive includes carbon that was released in the form of $CO_2$ from the combustion of fuel. In some embodiments, the invention provides a non-cementitious composition in which the $CO_2$ sequestering additive is a carbonate compound. In some embodiments, the invention provides a non-cementitious composition in which the carbonate compound composition includes a precipitate from an alkaline-earth-metal-containing water. In some embodiments, the invention provides a non-cementitious composition in which the alkaline-earth-metal-containing water from which the carbonate compound composition precipitate forms includes $CO_2$ derived from an industrial waste stream. In some embodiments, the invention provides a non-cementitious composition in which the non-cementitious composition is a paper product. In some embodiments, the invention provides a non-cementitious composition in which the non-cementitious composition is a polymeric product. In some embodiments, the invention provides a non-cementitious composition in which the non-cementitious composition is a lubricant. In some embodiments, the invention provides a non-cementitious composition in which the non-cementitious composition is an adhesive. In some embodiments, the invention provides a non-cementitious composition in which the non-cementitious composition is rubber. In some embodiments, the invention provides a non-cementitious composition in which the non-cementitious composition is chalk. In some embodiments, the invention provides a non-cementitious composition in which the non-cementitious composition is an asphalt product. In some embodiments, the invention provides a non-cementitious composition in which the non-cementitious composition is paint. In some embodiments, the invention provides a non-cementitious composition in which the non-cementitious composition is an abrasive for paint removal. In some embodiments, the invention provides a non-cementitious composition in which the non-cementitious composition is a personal care product. In some embodiments, the invention provides a non-cementitious composition that is a personal care product in which the personal care product is a cosmetic. In some embodiments, the invention provides a non-cementitious composition that is a personal care product in which the personal care product is a cleaning product. In some embodiments, the invention provides a non-cementitious composition that is a personal care product in which the personal care product is a personal hygiene product. In some embodiments, the invention provides a non-cementitious composition in which the non-cementitious composition is an ingestible product. In some embodiments, the invention provides a non-cementitious composition that is an ingestible product, in which the ingestible product is a liquid. In some embodiments, the invention provides a non-cementitious composition that is an ingestible product, in which the ingestible product is a solid. In some embodiments, the invention provides a non-cementitious composition that is an ingestible product, in which the ingestible product is an animal ingestible product. In some embodiments, the invention provides a non-cementitious composition in which the non-cementitious composition is an agricultural product. In some embodiments, the invention provides a non-cementitious composition that is an agricultural product, in which the agricultural product is a soil amendment product. In some embodiments, the invention provides a non-cementitious composition that is an agricultural product, in which the agricultural product is a pesticide. In some embodiments, the invention provides a non-cementitious composition in which the non-cementitious composition is an environmental remediation product. In some embodiments, the invention provides a non-cementitious composition that is an environmental remediation product in which the environmental remediation product is forest soil restoration. In some embodiments, the invention provides a non-cementitious composition that is an environmental remediation product in which the environmental remediation product is neutralization of over-acidified water.

In some embodiments, the invention provides a method of producing a non-cementitious composition, in which the method includes obtaining a $CO_2$ sequestering additive, in which the $CO_2$ sequestering additive includes carbon that was released in the form of $CO_2$ from the combustion of fuel and producing a non-cementitious composition that includes the $CO_2$ sequestering additive. In some embodiments, the invention provides a method of producing a non-cementitious composition in which the $CO_2$ sequestering additive is a carbonate compound composition. In some embodiments, the invention provides a method of producing a non-cementitious composition in which the carbonate compound composition includes a precipitate from an alkaline-earth-metal-containing water. In some embodiments, the invention provides a method of producing a non-cementitious composition in which the alkaline-earth-metal-containing water includes $CO_2$ derived from an industrial waste stream. In some embodiments, the invention provides a method of producing a non-cementitious composition in which the non-cementitious composition is a paper product. In some embodiments, the invention provides a method of producing a non-cementitious composition in which the non-cementitious composition is a lubricant. In some embodiments, the invention provides a method of producing a non-cementitious composition in which the non-cementitious composition is an adhesive. In some embodiments, the invention provides a method of producing a non-cementitious composition in which the non-cementitious composition is rubber. In some embodiments, the invention provides a method of producing a non-cementitious composition in which the non-cementitious composition is chalk. In some embodiments, the invention provides a method of producing a non-cementitious composition in which the non-cementitious composition is an asphalt product. In some embodiments, the invention provides a method of producing a non-cementitious composition in which the non-cementitious composition is paint. In some embodiments, the invention provides a method of producing a non-cementitious composition in which the non-cementitious composition is an abrasive for paint removal. In some embodiments, the invention provides a method of producing a non-cementitious composition in which the non-cementitious composition is a personal care product. In some embodiments, the invention provides a method of producing a non-cementitious composition that is a personal care product, in which the personal care product is a cosmetic. In some embodiments, the invention provides a method of producing a non-cementitious composition that is a personal care product, in which the personal care product is a cleaning product. In some embodiments, the invention provides a method of producing a non-cementitious composition that is a personal care product, in which the personal care product is a personal hygiene product. In some embodiments, the invention provides a method of producing a non-cementitious composition in which the non-cementitious composition is an ingestible product. In some embodiments, the invention provides a method of producing a non-cementitious composition that is an ingestible product, in which the ingestible product is a liquid. In some embodiments, the invention provides a method of producing a non-cementitious composition that is an ingestible product, in which the ingestible product is a solid. In some embodiments, the invention provides a method of producing a non-cementitious composition in which the non-cementitious composition is an animal ingestible product. In some embodiments, the invention provides a method of producing a non-cementitious composition in which the non-cementitious composition is an agricultural product. In some embodiments, the invention provides a method of producing a non-cementitious composition that is an agricultural product, in which the agricultural product is a soil amendment product. In some embodiments, the invention provides a method of producing a non-cementitious composition that is an agricultural product, in which the agricultural product is a pesticide. In some embodiments, the invention provides a method of producing a non-cementitious composition in which the non-cementitious composition is an environmental remediation product. In some embodiments, the invention provides a method of producing a non-cementitious that is an environmental remediation product, in which environmental remediation product is forest soil restoration. In some embodiments, the invention provides a method of producing a non-cementitious that is an environmental remediation product, in which environmental remediation product is neutralization of over-acidified water.

In some embodiments, the invention provides a method of sequestering carbon dioxide that includes precipitating a $CO_2$ sequestering carbonate compound composition from an alkaline-earth-metal-containing water, in which the carbonate compound composition includes carbon that was released in the form of $CO_2$ from the combustion of fuel and producing a $CO_2$ sequestering additive comprising the carbonate compound composition and producing a non-cementitious composition comprising the $CO_2$ sequestering additive. In some embodiments, the invention provides a method of sequestering carbon dioxide in which the alkaline-earth-metal-containing water is contacted to an industrial waste stream prior to the precipitation step.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
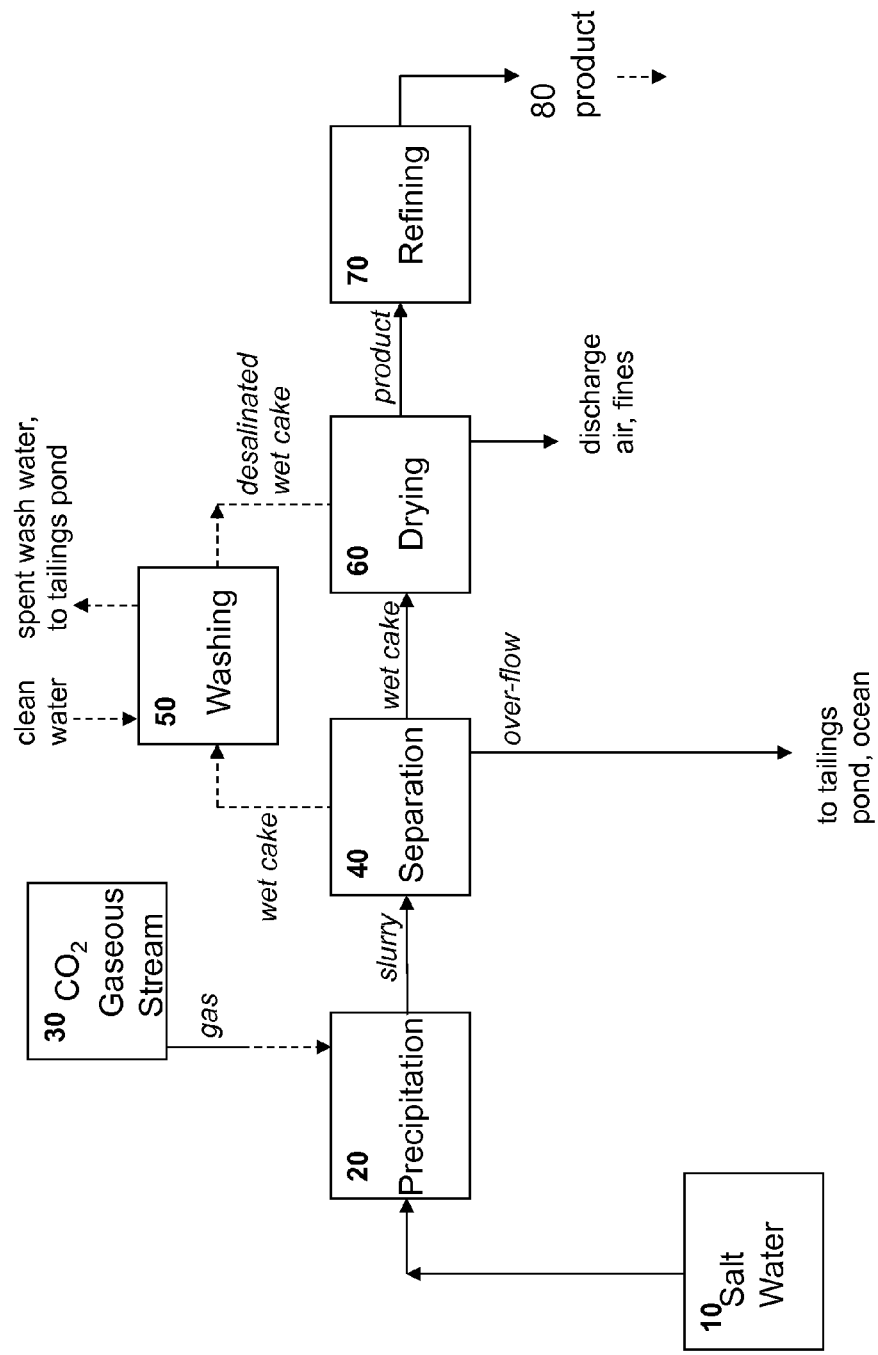
FIG. 1 provides a schematic of a $CO_2$ sequestering additive production process according to an embodiment of the invention.

Non-cementitious $CO_2$ sequestering compositions are provided. The compositions of the invention include a $CO_2$ sequestering additive, e.g., a $CO_2$ sequestering carbonate composition. Additional aspects of the invention include methods of making and using the non-cementitious $CO_2$ sequestering compositions.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing the subject invention, embodiments of the non-cementitious $CO_2$ sequestering compositions, as well as methods and systems for their production, will be described first in greater detail. Next, examples of methods of using the $CO_2$ sequestering compositions will be reviewed further.

Non-Cementitious $CO_2$ Sequestering Compositions

Non-cementitious $CO_2$ sequestering compositions are provided by the invention. By "$CO_2$ sequestering composition" is meant that the composition contains carbon derived from a fuel used by humans, e.g., carbon having a fossil fuel origin. For example, $CO_2$ sequestering compositions according to aspects of the present invention contain carbon that was released in the form of $CO_2$ from the combustion of fuel. In certain embodiments, the carbon sequestered in a $CO_2$ sequestering composition is in the form of a carbonate compound. Therefore, in certain embodiments, $CO_2$ sequestering compositions according to aspects of the subject invention contain carbonate compounds where at least part of the carbon in the carbonate compounds is derived from a fuel used by humans, e.g., a fossil fuel. As such, production of compositions of the invention results in the placement of $CO_2$ into a storage stable form, e.g., a stable component of a non-cementitious composition. Production of the $CO_2$ sequestering compositions of the invention thus results in the prevention of $CO_2$ gas from entering the atmosphere. The compositions of the invention provide for storage of $CO_2$ in a manner such that $CO_2$ sequestered (i.e., fixed) in the composition does not become part of the atmosphere. Compositions of the invention keep their sequestered $CO_2$ fixed for substantially the useful life the composition, if not longer, without significant, if any, release of the $CO_2$ from the composition. As such, where the compositions are consumable compositions, the $CO_2$ fixed therein remains fixed for the life of the consumable, if not longer.

$CO_2$ sequestering compositions of the invention include compositions that contain carbonates and/or bicarbonates, which may be in combination with a divalent cation such as calcium and/or magnesium, or with a monovalent cation such as sodium. The carbonates and/or bicarbonates may be in solution, in solid form, or a combination of solution and solid form, e.g., a slurry. The carbonates and/or bicarbonates may contain carbon dioxide from a source of carbon dioxide; in some embodiments the carbon dioxide originates from the burning of fossil fuel, and thus some (e.g., at least 10, 50, 60, 70, 80, 90, 95%) or substantially all (e.g., at least 99, 99.5, or 99.9%) of the carbon in the carbonates and/or bicarbonates is of fossil fuel origin, i.e., of plant origin. As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ of less than, e.g., −10‰, or less than −15‰, or less than −20‰, or less than −35‰, or less than −30‰, or less than −35‰ as described in further detail herein below.

Compositions of the invention include a $CO_2$ sequestering additive. $CO_2$ sequestering additives are components that store a significant amount of $CO_2$ in a storage stable format, such that $CO_2$ gas is not readily produced from the product and released into the atmosphere. In certain embodiments, the $CO_2$ sequestering additives can store 50 tons or more of $CO_2$, such as 100 tons or more of $CO_2$, including 250 tons or more of $CO_2$, for instance 500 tons or more of $CO_2$, such as 750 tons or more of $CO_2$, including 900 tons or more of $CO_2$ for every 1000 tons of composition of the invention. In certain embodiments, the $CO_2$ sequestering additives of the compositions of the invention comprise about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$, e.g., present as one or more carbonate compounds.

The $CO_2$ sequestering additives of the invention may include one or more carbonate compounds. The amount of carbonate in the $CO_2$ sequestering additive, as determined by coulometry using the protocol described in coulometric titration, may be 40% or higher, such as 70% or higher, including 80% or higher. In some embodiments, where the Mg source is a mafic mineral (as described in U.S. Provisional Application Ser. No. 61/079,790, incorporated by reference herein), or an ash (as described in U.S. Provisional Application Ser. No. 61/073,319, incorporated herein by reference), the resultant product may be a composition containing silica as well as carbonate. In these embodiments, the carbonate content of the product may be as low as 10%.

The carbonate compounds of the $CO_2$ sequestering additives may be metastable carbonate compounds that are precipitated from a water, such as a salt-water, as described in greater detail below. The carbonate compound compositions of the invention include precipitated crystalline and/or amorphous carbonate compounds. Specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to: magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$) and amorphous magnesium calcium carbonate ($MgCO_3 \cdot nH_2O$). Calcium magnesium carbonate minerals of interest include, but are not limited to dolomite ($CaMgCO_3$), huntite ($CaMg_3(CO_3)_4$) and sergeevite ($Ca_2Mg_{11}(CO_3)_{13} \cdot H_2O$). In certain embodiments, non-carbonate compounds like brucite ($Mg(OH)_2$) may also form in combination with the minerals listed above. As indicated above, the compounds of the carbonate compound compositions are metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite.

The $CO_2$ sequestering additives of the invention are derived from, e.g., precipitated from, a water (as described in greater detail below). As the $CO_2$ sequestering products are precipitated from a water, they may include one or more additives that are present in the water from which they are derived. For example, where the water is salt water, the $CO_2$ sequestering products may include one or more compounds found in the salt water source. These compounds may be used to identify the solid precipitations of the compositions that come from the salt water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

Depending on the particular non-cementitious material or product, the amount of $CO_2$ sequestering additive that is present may vary. In some instances, the amount of $CO_2$ sequestering additive ranges from 5 to 75% w/w, such as 5 to 50% w/w including 5 to 25% w/w and including 5 to 10% w/w.

The compositions of the invention may be viewed as low-carbon footprint compositions. Low-carbon footprint compositions have a reduced carbon footprint as compared to corresponding compositions that lack the $CO_2$ sequestering additive (where "corresponding" herein means the identical composition but for the presence of the $CO_2$ sequestering additive of the invention). Using any convenient carbon footprint calculator, the magnitude of carbon footprint reduction of the compositions of the invention as compared to corresponding compositions that lack the $CO_2$ sequestering additive may be 5% or more, such as 10% or more, including 25%, 50%, 75% or even 100% or more. In certain embodiments, the low-carbon footprint compositions of the invention are carbon neutral, in that they have substantially no, if any, calculated carbon footprint, e.g., as determined using any convenient carbon footprint calculator that is relevant for a particular composition of interest. Carbon neutral compositions of the invention include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral compositions have 0 or negative lbs $CO_2$/cu yd material, such as negative 1 or more, e.g., negative 3 or more lbs $CO_2$/cu yd material. In some instances, the low carbon footprint compositions have a significantly negative carbon footprint, e.g., -100 or more lbs $CO_2$/cu yd or less.

In certain embodiments compositions of the invention will contain carbon from fossil fuel; because of its fossil fuel origin, the carbon isotopic fractionation ($\delta^{13}C$) value of such compositions will be different from that of compositions containing inorganic carbon, e.g., limestone. As is known in the art, the plants from which fossil fuels are derived preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range -30 to -20‰ and $\delta^{13}C$ values for methane may be as low as -20‰ to -40‰ or even -40‰ to -80‰. $\delta^{13}C$ values for atmospheric $CO_2$ are -10‰ to -7‰, for limestone +3‰ to -3‰, and for marine bicarbonate, 0‰. Even if the non-cementitious material contains some natural limestone, or other source of C with a higher (less negative) $\delta^{13}C$ value than fossil fuel, its $\delta^{13}C$ value generally will still be negative and less than (more negative than) values for limestone or atmospheric $CO_2$. In some embodiments, the non-cementitious material or product includes a $CO_2$-sequestering additive comprising carbonates, bicarbonates, or a combination thereof, in which the carbonates, bicarbonates, or a combination thereof have a carbon isotopic fractionation ($\delta^{13}C$) value less than -5.00‰. Compositions of the invention thus includes a non-cementitious material or product with a $\delta^{13}C$ less than -10‰, such as less than -12‰, -14‰, -16‰, -18‰, -20‰, -22‰, -24‰, -26‰, -28‰, or less than -30‰. In some embodiments the invention provides a non-cementitious material or product with a $\delta^{13}C$ less than -10‰. In some embodiments the invention provides a non-cementitious material or product with a $\delta^{13}C$ less than -14‰. In some embodiments the invention provides a non-cementitious material or product with a $\delta^{13}C$ less than -18‰. In some embodiments the invention provides a non-cementitious material or product with a $\delta^{13}C$ less than -20‰. In some embodiments the invention provides a non-cementitious material or product with a $\delta^{13}C$ less than -24‰. In some embodiments the invention provides a non-cementitious material or product with a $\delta^{13}C$ less than -28‰. In some embodiments the invention provides a non-cementitious material or product with a $\delta^{13}C$ less than -30‰. In some embodiments the invention provides a non-cementitious material or product with a $\delta^{13}C$ less than -32‰. In some embodiments the invention provides a non-cementitious material or product with a $\delta^{13}C$ less than -34‰. Such a non-cementitious materials or products may be carbonate-containing materials or products, as described above, e.g., a non-cementitious material or product with that contains at least 10, 20, 30, 40, 50, 60, 70, 80, or 90% carbonate, e.g., at least 50% carbonate w/w.

The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C \text{ \textperthousand} = [(^{13}C/^{12}C_{sample} - ^{13}C/^{12}C_{PDB\ standard})/(^{13}C/^{12}C_{PDB\ standard})] \times 1000$$

$^{12}$C is preferentially taken up by plants during photosynthesis and in other biological processes that use inorganic carbon because of its lower mass. The lower mass of $^{12}$C allows for kinetically limited reactions to proceed more efficiently than with $^{13}$C. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table 1 lists relative carbon isotope composition value ranges for relevant carbon sources for comparison.

Material incorporating carbon from burning fossil fuels reflects $\delta^{13}$C values that are more like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}$C value of the resultant material and confirming that it is not similar to the values for atmospheric carbon dioxide, nor marine sources of carbon.

TABLE 1

Relative carbon isotope composition ($\delta^{13}$C) values for carbon sources of interest.

| Carbon Source | $\delta^{13}$C Range [‰] | $\delta^{13}$C Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate (CO$_3$) | −2 to +2 | 0 |
| Marine Bicarbonate (HCO$_3$) | −3 to +1 | −1 |
| Coal from Yallourn Seam in Australia [1] | −27.1 to −23.2 | −25.5 |
| Coal from Dean Coal Bed in Kentucky, USA [2] | −24.47 to −25.14 | −24.805 |

[1] Holdgate, G. R. et al., Global and Planetary Change, 65 (2009) pp. 89-103.
[2] Elswick, E. R. et al., Applied Geochemistry, 22 (2007) pp. 2065-2077.

In some embodiments the invention provides a method of characterizing a composition comprising measuring its relative carbon isotope composition ($\delta^{13}$C) value. In some embodiments the composition is a composition that contains carbonates, e.g., magnesium and/or calcium carbonates. Any suitable method may be used for measuring the $\delta^{13}$C value, such as mass spectrometry or off-axis integrated-cavity output spectroscopy (off-axis ICOS).

One difference between the carbon isotopes is in their mass. Any mass-discerning technique sensitive enough to measure the amounts of carbon we have can be used to find ratios of the $^{13}$C to $^{12}$C isotope concentrations. Mass spectrometry is commonly used to find $\delta^{13}$C values. Commercially available are bench-top off-axis integrated-cavity output spectroscopy (off-axis ICOS) instruments that are able to determine $\delta^{13}$C values as well. These values are obtained by the differences in the energies in the carbon-oxygen double bonds made by the $^{12}$C and $^{13}$C isotopes in carbon dioxide. The $\delta^{13}$C value of a carbonate precipitate from a carbon sequestration process serves as a fingerprint for a CO$_2$ gas source, as the value will vary from source to source, but in most carbon sequestration cases $\delta^{13}$C will generally be in a range of −9‰ to −35‰.

In some embodiments the methods further include the measurement of the amount of carbon in the composition. Any suitable technique for the measurement of carbon may be used, such as coulometry.

Precipitation material, which comprises one or more synthetic carbonates derived from industrial CO$_2$, reflects the relative carbon isotope composition ($\delta^{13}$C) of the fossil fuel (e.g., coal, oil, natural gas, or flue gas) from which the industrial CO$_2$ (from combustion of the fossil fuel) was derived. The relative carbon isotope composition ($\delta^{13}$C) value with units of ‰ (per mille) is a measure of the ratio of the concentration of two stable isotopes of carbon, namely $^{12}$C and $^{13}$C, relative to a standard of fossilized belemnite (the PDB standard).

$$\delta^{13}C \text{ \textperthousand} = [(^{13}C/^{12}C_{sample} - ^{13}C/^{12}C_{PDB\ standard})/(^{13}C/^{12}C_{PDB\ standard})] \times 1000$$

As such, the $\delta^{13}$C value of the CO$_2$ sequestering additive serves as a fingerprint for a CO$_2$ gas source. The $\delta^{13}$C value may vary from source to source (i.e., fossil fuel source), but the $\delta^{13}$C value for composition of the invention generally, but not necessarily, ranges between −9‰ to −35‰. In some embodiments, the $\delta^{13}$C value for the CO$_2$ sequestering additive is between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}$C value for the CO$_2$ sequestering additive is less than (i.e., more negative than) −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰, wherein the more negative the $\delta^{13}$C value, the more rich the synthetic carbonate-containing composition is in $^{12}$C. Any suitable method may be used for measuring the $\delta^{13}$C value, methods including, but no limited to, mass spectrometry or off-axis integrated-cavity output spectroscopy (off-axis ICOS).

The compositions of the invention may vary greatly. By non-cementitious is meant that the compositions are not settable compositions, e.g., hydraulic cements. As such, the compositions are not dried compositions that, when combined with a setting fluid, such as water, set to produce a solid product. Illustrative compositions according to certain embodiments of the invention are now reviewed further in greater detail. However, the below review of compositions is not limiting on the invention, and is provided solely to further describe exemplary embodiments of the invention.

Paper Products

The present invention includes novel formulations which incorporate the CO$_2$ sequestering composition into paper products. The term "paper products" is employed to refer to a thin material that is suitable for use in one or more of writing upon, printing upon or packaging and includes products commonly known as paper, card stock, and paperboard. Card stock is a type of paper that is thicker and more durable than paper but more flexible than paperboard (e.g., cardboard). Paper products of the invention are produced by pressing together moist fibers (e.g., cellulose, polymeric) in the form of a pulp composition and then drying the pressed fibers to form sheets of varying thickness. Paper products of the invention may be produced in accordance with traditional manufacturing protocols with the exception that an amount of the $CO_2$ sequestering composition is employed. In producing paper products of the invention, an amount of the $CO_2$ sequestering composition may be employed as a filler, absorbent or colorant to the pulp composition. By "colorant" is meant a compound that is able to impart a color to a product. Since the $CO_2$ sequestering precipitate of the invention is inherently white in color, it is able to improve the white color of already white paper products, and lighten the color of paper products that are not white.

The pulp composition may be derived from components which include, but are not limited to eucalyptus pulp, banana tree bark, banana stem-fibers, cotton fibers, vulcanized polymers, cellulose fibers, animal skin (e.g., calfskin, sheepskin, goatskin), papyrus, high density polyethylene fibers, hemp, bamboo, grass, rags or pulp derived from the wood of any suitable tree. The moisture content of the pulp composition may vary, ranging from 5% to 10%, such as 6% and including 7%. In some instances, the $CO_2$ sequestering composition may be added to the pulp composition as an absorbent in order to decrease the moisture content in the paper.

The density of paper products of the invention may vary greatly. The density of "paper" ranges from 100 $kg/m^3$ to 1500 $kg/m^3$, such as 250 $kg/m^3$ to 1250 $kg/m^3$, including 500 $kg/m^3$ to 800 $kg/m^3$. The density of "papercard" or "card stock" ranges from 1500 $kg/m^3$ to 3000 $kg/m^3$, such as 1700 $kg/m^3$ to 2500 $kg/m^3$, and including 2000 $kg/m^3$ to 2250 $kg/m^3$. The density of "paperboard" can be 3000 $kg/m^3$ and denser, such as 3500 $kg/m^3$ and denser, including 5000 $kg/m^3$ and denser. The thickness of paper products the invention may also vary greatly. The thickness of "paper" ranges between 0.05 mm to 0.18 mm, such as 0.07 mm to 0.18 mm and including 0.1 mm to 0.15 mm. The thickness of "papercard" ranges between 0.18 mm to 0.25 mm, such as 0.18 mm to 0.2 mm and including 0.19 mm. The thickness of "paperboard" may be 0.25 mm and thicker, such as 0.3 mm and thicker, and including 1 mm and thicker. The weight of paper products of the invention may vary. By "weight" is meant the mass of paper product per unit area, usually measured in $g/m^2$. The weight of "paper" may range between 20 $g/m^2$ to 160 $g/m^2$, such as 60 $g/m^2$ to 150 $g/m^2$ and including 80 $g/m^2$ to 120 $g/m^2$. The weight of "papercard" may range between 160 $g/m^2$ to 500 $g/m^2$, such as 175 $g/m^2$ to 400 $g/m^2$ and including 200 to $g/m^2$ to 300 $g/m^2$. The weight of "paperboard" may range from 500 $g/m^2$ and heavier, such as 750 $g/m^2$ and heavier and including 2000 $g/m^2$ and heavier.

In manufacturing paper products of the invention, the pulp composition precursors of the paper products may include one or more additional components, such as sizing agents, additional fillers (e.g., clay, china) and pigments. The amount of $CO_2$ sequestering additive in the finished paper product may vary, and may be 1% by weight or more, such as 3% by weight or more, including 5% by weight or more. During manufacture, following production of the pulp with the $CO_2$ sequestering additive, the pulp may be pressed, dried and cut as desired to produce a product of desired dimensions. The paper may also be modified (e.g., bleached, treated with a sizing agent or surface coating) after the finished paper product has been produced.

Polymeric Products

The present invention also includes novel formulations which incorporate the $CO_2$ sequestering composition into polymeric products. The $CO_2$ sequestering additive may be present in the polymeric product in various amounts, as desired, and may be present as fillers and/or other purposes. As such, the amount of $CO_2$ sequestering additive in the polymeric composition may vary, and may be 1% by weight or more, such as 3% by weight or more, including 5% by weight or more. In certain embodiments, the polymeric products are plastics. The term "plastic" is used in its common sense to refer to a wide range of synthetic or semisynthetic organic solid materials suitable for the manufacture of industrial products (e.g., films, fibers, plates, tubes, bottles, boxes). Plastics may be polymers of high molecular weight, and may contain other substances to improve performance which may include but are not limited to acid scavengers, antimicrobial agents, antioxidants, antistatic agents, antifungal agents, clarifying agents, flame retardants, amine light stabilizers, UV absorbers, optical brighteners, photoselective additives, processing stabilizers, and the like. Plastics of the invention may be acrylics, polyesters, silicones, polyurethanes or halogenated plastics. Plastics of interest include, but are not limited to: polypropylenes (e.g., as employed in food containers, appliances, car bumpers), polystyrenes (e.g., as employed in packaging foam, food containers, disposable cups, plates, cutlery, CD and cassette boxes), high impact polystyrenes (e.g., as employed in fridge liners, food packaging, vending cups), acrylonitrile butadiene styrene (e.g., as employed in electronic equipment cases such as computer monitors, printers, keyboards), polyethylene terephthalates (e.g., as employed in carbonated drinks bottles, jars, plastic film, microwavable packaging), polyesters (e.g., as employed in fibers, textiles), polyamides (e.g., as employed in fibers, toothbrush bristles, fishing line, under-the-hood car engine mouldings), poly(vinyl chloride) (e.g., as employed in plumbing pipes and guttering, shower curtains, window frames, flooring), polyurethanes (e.g., as employed in cushioning foams, thermal insulation foams, surface coatings, printing rollers) polycarbonates (e.g., as employed in compact discs, eyeglasses, riot shields, security windows, traffic lights, lenses), polyvinylidene chloride (e.g., as employed in food packaging, saran), polyethylene (e.g., as employed in supermarket bags, plastic bottles) and polycarbonate/acrylonitrile butadiene styrene (e.g., as employed in car interior and exterior parts). Polymeric products, such as plastics, of the invention may be prepared in accordance with traditional manufacturing protocols for such compositions, with the exception that an amount of $CO_2$ sequestering additive of the invention is employed. As such, an amount of the $CO_2$ sequestering additive may be combined with other additives of the plastic precursor composition or feed, and then molded, cast, extruded into the final desired plastic product.

Lubricants

The present invention also includes novel formulations which incorporate the $CO_2$ sequestering composition into lubricants. The $CO_2$ sequestering composition may be present in the lubricants in various amounts, as desired, and may be present as fillers and/or other purposes. The amount of $CO_2$ sequestering additive in the lubricant may vary, and may be 1% by weight or more, such as 3% by weight or more, including 5% by weight or more. The lubricating oil composition may be formulated for commercial purposes for use in internal combustion engines, such as gasoline and diesel engines, crankcase lubrication and the like. The oil (sometimes referred to as "base oil") is an oil of lubricating viscosity and is the primary liquid constituent of a lubricant, into which additives and possibly other oils are blended to produce the final lubricant (herein "lubricating composition"). A base oil may be selected from natural (vegetable, animal or mineral) and synthetic lubricating oils and mixtures thereof. It may range in viscosity from light distillate mineral oils to heavy lubricating oils such as gas engine oil, mineral lubricating oil, motor vehicle oil, and heavy duty diesel oil. In some instances, the viscosity of the oil ranges from 2 to 30 $mm^2s^{-1}$, such as 5 to 20 $mm^2s^{-1}$ at 100° C.

Natural oils include animal oils and vegetable oils, liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halo-substituted hydrocarbon oils such as polymerized and inter-polymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and the derivatives; analogs and homologs thereof. Alkylene oxide polymers and interpolymers and derivatives thereof where the terminal hydroxyl groups have been modified, for example by esterification or etherification, constitute another class of known synthetic lubricating oils. Another suitable class of synthetic lubricating oils comprises the esters of dicarboxylic acids. Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol. Silicon-based oils such as the polyalkyl-, polyaryl-, polyakoxy-, or polyaryloxysiloxane oils and silicate oils comprise another useful class of synthetic lubricants.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products. Also present may be one or more co-additives. Known additives may be incorporated into the lubricant composition together with the additives of the invention. They may, for example, include dispersants; other detergents, e.g. single or mixed detergent systems; rust inhibitors; anti-wear agents; anti-oxidants; corrosion inhibitors; friction modifiers or friction reducing agents; pour point depressants; anti-foaming agents; viscosity modifiers; and surfactants. They can be combined in proportions known in the art. Some additives can provide a multiplicity of effects; thus, for example, a single additive may act as a dispersant and as an oxidation inhibitor.

In certain instances, the additive is a dispersant. A dispersant is an additive for a lubricant whose primary function is to hold solid and liquid contaminants in suspension, thereby passivating them and reducing engine deposits at the same time as reducing sludge depositions. Thus, for example, a dispersant maintains in suspension oil-insoluble substances that result from oxidation during use of the lubricant, thus preventing sludge flocculation and precipitation or deposition on metal parts of the engine. Dispersants are usually "ashless", being non-metallic organic materials that form substantially no ash on combustion, in contrast to metal-containing, and hence ash-forming, materials. They comprise a long chain hydrocarbon with a polar head, the polarity being derived from inclusion of, e.g. an O, P or N atom. The hydrocarbon is an oleophilic group that confers oil-solubility, having for example 40 to 500 carbon atoms. Thus, ashless dispersants may comprise an oil-soluble polymeric hydrocarbon backbone having functional groups that are capable of associating with particles to be dispersed. Typically, the dispersants comprise amine, alcohol, amide, or ester polar moieties attached to the polymer backbone often via a bridging group. The ashless dispersant may be, for example, selected from oil-soluble salts, esters, amino-esters, amides, imides, and oxazolines of long chain hydrocarbon-substituted mono- and dicarboxylic acids or their anhydrides; thiocarboxylate derivatives of long chain hydrocarbons; long chain aliphatic hydrocarbons having a polyamine attached directly thereto, and Mannich condensation products formed by condensing a long chain substituted phenol with formaldehyde and poly-alkylene polyamine, such as described in U.S. Pat. No. 3,442, 808. Dispersants include, for example, derivatives of long chain hydrocarbon-substituted carboxylic acids, examples being derivatives of high molecular weight hydrocarbyl-substituted succinic acid.

A noteworthy group of dispersants are hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. Nos. 3,202, 678; 3,154,560; 3,172,892; 3,024,195, 3,024,237; 3,219,666; and 3,216,936; and BE-A-66,875 that may be post-treated to improve their properties, such as borated (as described in U.S. Pat. Nos. 3,087,936 and 3,254,025) fluorinated and oxylated. For example, boration may be accomplished by treating an acyl nitrogen-containing dispersant with a boron compound selected from boron oxide, boron halides, boron acids and esters of boron acids. Also of interest are Anti-Wear and Anti-Oxidant Agents. Dihydrocarbyl dithiophosphate metal salts are frequently used in lubricants as anti-wear and anti-oxidant agents. The metal may be an alkali or alkaline earth metal, or aluminum, lead, tin, zinc, molybdenum, manganese, nickel or copper. The zinc salts are most commonly used in lubricating oil in amounts of 0.1 to 10, preferably 0.2 to 2, mass %, based upon the total weight of the lubricant. They may be prepared in accordance with known techniques by first forming a dihydrocarbyl dithiophosphoric acid (DDPA), usually by reaction of one or more alcohols or a phenol with $P_2S_5$ and then neutralising the formed DDPA with a zinc compound. The zinc dihydrocarbyl dithiophosphates can be made from mixed DDPA which in turn may be made from mixed alcohols. Alternatively, multiple zinc dihydrocarbyl dithiophosphates can be made and subsequently mixed. Lubricants of the invention may be prepared in accordance with traditional manufacturing protocols for such compositions, with the exception that an amount of $CO_2$ sequestering additive of the invention is employed. As such, an amount of the $CO_2$ sequestering additive may be combined with other components of the lubricant and combined into the final desired lubricant product.

Adhesives

The present invention also includes novel formulations which incorporate the $CO_2$ sequestering composition into adhesives. By "adhesives" is meant compounds that adhere to a substrate or bond two substrates together. Adhesives of the invention may be produced in accordance with traditional manufacturing protocols with the exception that an amount of the $CO_2$ sequestering composition is employed. In producing adhesives of the invention, an amount of the $CO_2$ sequestering composition may be employed as colorants, fillers, and to improve rheology and increase tensile strength.

The physical properties of adhesives of the invention may vary greatly depending upon the type of chemical system employed and the amount of the $CO_2$ sequestering composition added. The viscosity may range from 1.0 cP to 750000 cP, such as 100 cP to 10000 cP, including 500 cP to 5000 cP, and including 1500 cP to 3000 cP. The effective temperature of the adhesive may range between $-75°$ C. to $500°$ C., such as $0°$ C. to $200°$ C. and including $50°$ C. to $150°$ C. By "effective temperature" is meant the temperature range in which the adhesive shows no significant changes in its physical properties or utility (i.e., insignificant change in substrate bonding). The tensile strength of the adhesive may range from 0.1 MPa to 75 MPa, such as 10 MPa to 50 MPa and including 15 to 35 MPa. The elongation capacity of the adhesives may range from 1.0% to 150%, such as 40% to 100% and including 50% to 75%.

When added, the $CO_2$ sequestering composition may increase the viscosity, the storage and loss moduli of the adhesive, and in some instances, impart pseudoplasticity and thixotropy. The amount of $CO_2$ sequestering composition in adhesives of the invention may vary, ranging from 5 to 40% by weight, such as 5 to 25% by weight and including 10 to 15% by weight.

Adhesives of the invention may be natural or synthetic. Natural adhesives are made from inorganic mineral sources or biological sources such as vegetable matter, dextrin or other natural resins. Synthetic adhesives usually comprise a chemical system (e.g., polymeric material), binders (e.g., polyester, polyurethane, acrylic resin), an aqueous or organic solvent and one or more additives. Exemplary chemical systems may include polyoxymethylene, acrylic, polyacrylate, bismaleimide, butyl, cyanoacrylate, epoxy, ethylene copolymer, fluoropolymer, polyisoprene, polyamide, polyphenylene sulfide, polysulfide, polypropylene, polybutadiene, polyolefinic, polyester, polyurethane, polyphenolic, silicone, starch, polystyrene, styrene copolymer, vinyl, polyvinylcarbonate, rubber, elastomer, and compatible mixtures thereof.

In some embodiments, adhesives of the invention may be liquid compositions which employ a solvent. Exemplary solvents may include, but are not limited to xylene, methanol, toluene, mineral spirits, acetone, butyl acetate, brominated solvents, mixtures thereof, among others. The amount of solvent comprises about 10% to 90% of the liquid composition, such as 50% to 75%, including 60% to 70%. The liquid composition may be applied by brushing, spraying, rolling, immersing the substrate into the composition, or any other convenient method for applying a coating to a surface. In some instances, depending on the amount of solvent, the liquid adhesive composition may be employed as a caulk or sealant. In other instances, the liquid adhesive composition may be dispensed using an aerosol sprayer by formulating the adhesive with a suitable propellant. Exemplary propellants include, but are not limited to fluorinated propellants such as HFCs, hydrocarbons such as propane, butane, isobutane, pentane, nitrogen, carbon dioxide and any compatible mixtures thereof. The amount of propellant may vary, ranging from 10% to 30%, such as 15% to 25%, including 15% to 20%. The composition, including the sprayable propellant may be packaged into an aerosol by any convenient protocol.

In other embodiments, adhesives of the invention may be viscous liquids, gels, soft solids or powders. In producing the viscous liquid, soft solid, solid and gel adhesives, the components may be blended and mixed using any convenient protocol. Exemplary methods for blending the components include but are not limited to banbury mixers, sigman blade mixers, double arm mixers, vortexing mixers, mixers that employ sonication, mixers that employ heavy agitation, among others. Solid, soft solid and gel adhesives of the invention may then be further shaped by extruding, rotary pressing, stamping, cutting, laminating or molding to produce the final adhesive product. In manufacturing adhesives of the invention, the above mentioned constituents may also include one or more additional components, such as anti-foaming agents, wetting agents, thickeners, plasticizers, antioxidants and metal chelating agents. Tackifiers which increase the adhesion of the compositions in general or for specific surfaces may also be added. Exemplary tackifiers include polyterpene resins, gum rosin, rosin esters and other rosin derivatives, oil-soluble phenolic resins, coumaroneindene resins and petroleum hydrocarbon resins.

Methods of setting (i.e., curing) the adhesive product may include air drying, anaerobic drying, thermoplastic setting, thermoset, two-component setting, UV or radiation cured, pressure induced setting, single component setting, moisture cured and vulcanization.

Adhesives of the invention may be compatible with use on a number of different types of substrates including but not limited to ceramic, glass, concrete, masonry, composite materials, metal, paper or paperboard, plastic, porous surfaces, rubber, elastomer, textiles, fabrics or wood.

Rubber

The present invention also includes novel formulations which incorporate the $CO_2$ sequestering composition into rubber. The term "rubber" is used in its conventional sense to mean an elastic material of varying chemical composition which comprise long thread-like molecules and possess a flexibility in its molecular chain to allow for overall material flexing and coiling. Rubber of the invention may be produced in accordance with traditional manufacturing protocols with the exception that an amount of the $CO_2$ sequestering composition is employed. In producing rubber of the invention, an amount of the $CO_2$ sequestering composition may be employed as colorants, fillers and to improve workability of the raw rubber product. Rubber of the invention may be natural or synthetic. The term "natural" refers to rubber in the form of a hydrocarbon polymer of isoprene units derived from the milky colloidal suspension from the sap of a rubber tree or other such plants. Synthetic rubber may be derived from a number of different synthetic polymers including, but not limited to poly-styrene-butadiene, polyisobutylene, ethylene-propylene copolymer, polyneoprene, butadiene-acrylonitrile copolymer, fluoroelastomers, polyurethane, polysulfide, polyacrylate among others. Rubber of the invention may also include one or more additives, which include a vulcanizing agent, a vulcanization accelerator, a process oil, an anti-aging agent, an antioxidant and an anti-ozonant. In producing rubber of the invention, the components may be blended or mixed with the $CO_2$ sequestering composition using any convenient protocol. Exemplary methods for blending the compositions include banbury mixers, sigman blade mixers, double-arm mixers, vortexing mixers, mixers that employ sonication, mixers that employ heavy agitation, among others. The rubber may be further shaped by rotary pressing, extruding, stamping, cutting, molding or any other convenient protocol into the final rubber product.

Chalk

The present invention also includes novel formulations which incorporate the $CO_2$ sequestering composition into chalk. The term "chalk" is used in its conventional sense to refer to a marking element usually in the form of a stick or block used for writing or drawing on a rough surface. Chalk in the present invention is a mixture of an amount of the $CO_2$ sequestering composition with one or more thermosetting synthetic binders which is further processed into the form of sticks or blocks. Binders used in the production of chalk may be any conventional thermosetting synthetic binder. Exemplary binders include uncured epoxy, polyester, polyurethane or acrylic resins, or compatible mixtures thereof. Sticks or blocks of chalk are produced by forming a uniform mixture of the $CO_2$ sequestering composition with the synthetic binder and pressing it under high pressure at room temperature. The procedure is preferably such that the mixture of components are processed in an extrusion press, cooled and crushed to a fine particle size, such as 100 microns or smaller, including 75 microns or smaller and preferably 60 microns or smaller. The pulverulent mixture of components obtained is then pressed at room temperature and under a pressure sufficient to consolidate the powder (e.g., 10-35 MPa) into sticks or blocks of chalky and friable consistency. Smaller sticks or blocks may also be cut from larger pre-pressed blocks. Colored chalk may also be produced using the above described method, with the exception that a colorant (i.e., dye) may be added to the $CO_2$ sequestering composition and binder mixture.

Asphalt Products

The present invention also includes novel formulations which incorporate the $CO_2$ sequestering composition into asphalt products. The term "asphalt" (i.e., bitumen) is used in its conventional sense to refer to the natural or manufactured black or dark-colored solid, semisolid or viscous material composed mainly of high molecular weight hydrocarbons derived from a cut in petroleum distillation after naptha, gasoline, kerosene and other fractions have been removed from crude oil.

The molecular composition of asphalt products may vary. Asphalt products of the invention may be composed of saturated and unsaturated aliphatic and aromatic compounds that possess functional groups that include, but are not limited to alcohol, carboxyl, phenolic, amino, thiol functional groups. In an exemplary embodiment, asphalt products may be 80% carbon by weight, 10% hydrogen by weight, 6% sulfur by weight, 3% total weight of oxygen and nitrogen; and may also include trace amounts of various metals such as iron, nickel and vanadium. The molecular weight of asphalt products may range from 0.2 kDa to 50 kDa, such as 1 kDa to 25 kDa, including 2 kDa to 10 kDa. Components of asphalts may be asphaltenes (i.e., high molecular weight compounds that are insoluble in hexane or heptane) or maltenes (i.e., lower molecular weight compounds that are soluble in hexane or heptane). The amount of asphaltenes in asphalt products may vary, ranging from 5% to 25% by weight, such as 10% to 20%, and including 12% to 15%. In some embodiments, asphalt products of the invention may also contain a polymeric additive to enhance workability, viscoelasticity, and strain recovery. Exemplary polymeric additives include polybutadiene, polyisoprene, ethylene/vinyl acetate copolymer, polyacrylate, polymethacrylate, polychloroprene, etc. Asphalt products of interest also include an amount of aggregate. Aggregate of the invention may be any convenient aggregate material. The aggregate material may be $CO_2$ sequestering aggregates, for example as described in U.S. patent application Ser. No. 12/475,378, titled "ROCK AND AGGREGATE, AND METHODS OF MAKING AND USING THE SAME"; the disclosure of which is herein incorporated by reference.

Asphalt products of the invention may be prepared in accordance with traditional manufacturing protocols, with the exception that an amount of the $CO_2$ sequestering composition of the invention is employed. The amount of $CO_2$ sequestering additive, e.g., present in the asphalt product may vary, and may be 1% by weight or more, such as 3% by weight or more, including 5% by weight or more, such as 25% by weight or more, 50% by weight or more, 75% by weight or more. As such, an amount of the $CO_2$ sequestering additive may be combined with other components of the asphalt product (e.g., asphalt, aggregate, cutback solvents, polymeric additives), and then mixed to produce the final asphalt product.

Paint

The present invention also includes novel formulations which incorporate the $CO_2$ sequestering composition into paint. By "paint" is meant any liquid, liquefiable, or mastic composition which, after application to a substrate in a thin layer, is converted to an opaque solid film. Paints may include one or more of the following components: pigments, binders, solvents and additives. Pigments are granular solids incorporated into the paint, e.g., to contribute color, toughness or simply to reduce the cost of the paint. Pigments of interest include natural and synthetic types. Natural pigments include various clays, calcium carbonate, mica, silicas, and talcs. Synthetic pigments include engineered molecules, calcined clays, blanc fix, precipitated calcium carbonate, and synthetic silicas. Hiding pigments, in making paint opaque, also protect the substrate from the harmful effects of ultraviolet light. Hiding pigments include titanium dioxide, phthalo blue, red iron oxide, and many others. Fillers are a special type of pigment that serve to thicken the film, support its structure and simply increase the volume of the paint. Fillers of interest include inert materials, such as talc, lime, baryte, clay, etc. Floor paints that will be subjected to abrasion may even contain fine quartz sand as a filler. Not all paints include fillers. On the other hand some paints contain very large proportions of pigment/filler and binder. The $CO_2$ sequestering additive of the invention may be employed in place of all or some of the above pigment components in a given paint. The binder, or resin, is the actual film forming component of paint. The binder imparts adhesion, binds the pigments together, and strongly influences such properties as gloss potential, exterior durability, flexibility, and toughness. Binders of interest include synthetic or natural resins such as acrylics, polyurethanes, polyesters, melamine resins, epoxy, or oils, etc. Solvents of interest may be present, e.g., to adjust the viscosity of the paint. They may be volatile so as not to become part of the paint film. Solvents may be included to control flow and application properties, and affect the stability of the paint while in liquid state. Solvents of interest include water, e.g., water-based paints and organic solvents, e.g., aliphatics, aromatics, alcohols, and ketones. Organic solvents such as petroleum distillate, esters, glycol ethers, and the like find use. Additives of interest include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, and the like.

Paint products of the invention may be prepared in accordance with traditional manufacturing protocols with the exception that an amount of $CO_2$ sequestering additive of the invention is employed. The amount of $CO_2$ sequestering additive in the paint may vary, and may be 1% by weight or more, such as 3% by weight or more, including 5% by weight or more, such as 25% by weight or more. As such, an amount of the $CO_2$ sequestering additive may be combined with other components of the paint such as pigment, binder, solvent, additive and then mixed to produce the final paint product.

Personal Care, Cleaning and other Non-ingestible Products

The present invention also includes novel formulations which incorporate the $CO_2$ sequestering composition into non-ingestible products. By "non-ingestible" is meant compounds that are not suitable for consumption. Of interest are novel non-ingestible formulations which incorporate the $CO_2$ sequestering composition of the invention into personal care products. Personal care products of the invention are compositions intended for cleaning purposes or personal use such as for health and/or hygiene purposes. Personal care products may be products that relate to sun-care (e.g., sunscreens, sun-tan lotion, self tanning compositions, bronzers), baby-care (e.g., diapers, baby wipes, baby powder, diaper rash products), facial and body treatment (e.g., acne prevention wipes, acne treatment cream, facial cleansing soap and exfoliating soap, antiperspirants, deodorants, aftershave lotion, bath soap, bath wash, shaving cream, shaving gel, makeup removal, moisturizers, anti-wrinkle creams, lotions), footcare (anti-itch cream, anti-fungal creams), oral-care (toothpaste, mouthwash), hair-care (shampoo, conditioner, hair spray, hair gel, mouse, colorants, depilatory treatments, hair bleach) and First Aid (bandages, antiseptic sprays, antibacterial gels). Another type of personal care product is cosmetics. Cosmetics of the invention are makeup products that include, but are not limited to mascara, eyeshadow, eyeliner, blush, concealer, foundation, face powder, lipstick, lip gloss, lip treatment, lipliner and nail polish. Another type of personal care product are cleaning products. Cleaning products of the invention are compounds used primarily in the removal of dirt, stains, impurities, microorganisms and the like. Cleaning products of the invention may be products that relate to laundry cleaners (e.g., laundry detergent, stain remover, fabric softener), dishwashing products (dishwashing liquid, dishwashing powders, dishwashing gels, rinse agents, fast-dry agents), room deodorizing products, bathroom cleaners (toilet, shower, marble, porcelain), powdered bleach, shoe polish and all-purpose cleaners.

The $CO_2$ sequestering composition of the invention may be employed in non-ingestible products as an abrasive, absorbent, buffering agent, filler, anti-caking agent, colorant, opacifying agent, UV-scattering agent or oral care agent. Traditional abrasives, absorbents, buffering agents, fillers, colorants, anti-caking agents, opacifying agents, UV-scattering agents or oral care agents that are conventionally found in non-ingestible products may be substituted entirely or a certain amount removed and replaced using the $CO_2$ sequestering composition of the present invention. The $CO_2$ sequestering composition used to replace traditional additives may be present in amounts such as 1% by weight or more, such as 3% by weight or more, including 5% by weight or more, such as 25% by weight or more, 50% by weight or more, 75% by weight or more.

In some embodiments, the $CO_2$ sequestering composition of the invention may be employed in non-ingestible products as an abrasive. By "abrasive" is meant a compound that contains an amount of roughness which when used on a surface is able to abrade, smooth, buff, polish, grind and the like. The roughness of the abrasive may vary, depending on the particle sizes of the $CO_2$ sequestering composition. In some instances, the particle sizes of the $CO_2$ sequestering composition are small ($\leq 0.5$ micron) and may be incorporated into non-ingestible products where only a mild abrasive is desired (e.g., bathroom cleaners, baby wipes). In other instances, the particle sizes of the $CO_2$ sequestering precipitate are large ($\geq 5$ micron) and may be incorporated into non-ingestible products where a strong abrasive is desired (e.g., bath soap, toothpaste). Exemplary non-ingestible products of the invention employing the $CO_2$ sequestering composition as an abrasive include toothpaste, shoe polish, mouthwash, facial cleansing soaps, exfoliating products, acne prevention wipes, bath soap, bath wash, makeup remover, baby wipes, diaper rash products, bathroom cleaners, powdered bleach and all purpose cleaners. In some embodiments, the $CO_2$ sequestering composition is employed as an abrasive for paint removal, such as in processes employing blasting techniques wherein the abrasive is suspended in a liquid and applied to a painted or coated surface. The $CO_2$ sequestering composition may be used as an abrasive for paint removal in cases where the surfaces are delicate, such as lightweight metal and plastic surfaces, in some embodiments of the invention.

In other embodiments, the $CO_2$ sequestering composition of the invention may be employed in non-ingestible products as an absorbent. By "absorbent" is meant a compound that possesses the capacity to absorb or soak up liquids (i.e., drying agent). Exemplary non-ingestible products of the invention employing the $CO_2$ sequestering composition as an absorbent include eyeshadow, blush, concealer, foundation, face powder, sunscreen, sun-tan lotion, self tanning compositions, bronzers, baby powder, diaper rash products, deodorants and antiperspirants.

In other embodiments, the $CO_2$ sequestering composition of the invention may be employed in non-ingestible products as an anticaking agent. By "anticaking agent" is meant a compound that prevents solid compositions from forming large aggregates (i.e., clumps) and facilitates a consistent granular or powdered composition. Exemplary non-ingestible products of the invention employing the $CO_2$ sequestering composition as an anticaking agent include baby powder, foundation, face powder, blush, eyeshadow, diaper rash products, concealer, laundry detergent, dishwashing powder, rinse agents, fast-dry agents, room deodorizing powders, bathroom cleaners and powdered bleach.

In other embodiments, the $CO_2$ sequestering composition of the invention may be employed in non-ingestible products as a buffering agent. By "buffering agent" is meant a compound that minimizes changes in pH. As such, the $CO_2$ sequestering component may act to buffer any acidic or basic components traditionally used in formulations for these products or may be used to maintain a suitable pH during its use. Exemplary non-ingestible products of the invention employing the $CO_2$ sequestering composition as a buffering agent include lip gloss, nail polish, sunscreens, sun-tan lotion, baby wipes, acne prevention wipes, acne treatment cream, facial cleansing soap and exfoliating soap, antiperspirants, deodorants, aftershave lotion, bath soap, bath wash, shaving cream, shaving gel, makeup removal, moisturizers, anti-wrinkle creams, anti-drying lotions, anti-itch cream, anti-fungal creams, conditioner, hair spray, hair gel, mouse, hair colorants, depilatory treatments, hair bleach, antiseptic sprays, antibacterial gels, laundry detergent, stain remover, teeth whitening agents, dishwashing liquid, dishwashing powders, dishwashing gels, rinse agents, fast-dry agents, bathroom cleaners and all-purpose cleaners.

In other embodiments, the $CO_2$ sequestering composition of the invention may be employed in non-ingestible products as a filler. By "filler" is meant a non-reactive, solid ingredient used to dilute other solids, or to increase the volume of a product. In some instances, the $CO_2$ sequestering composition may be used to dilute a potent active ingredient, which may be present in very small amounts, so that the product can be handled more easily. In other instances, the $CO_2$ sequestering composition may be used to increase the volume of an expensive ingredient without disturbing the main function of the product. Exemplary non-ingestible products of the invention employing the $CO_2$ sequestering composition as a filler include baby powder, foundation, face powder, blush, eyeshadow, diaper rash products, concealer, laundry detergent, dishwashing powder, rinse agents, fast-dry agents, room deodorizing powders, bathroom cleaners and powdered bleach.

In other embodiments, the $CO_2$ sequestering composition of the invention may be employed in non-ingestible products as a colorant. By "colorant" is meant a compound that is able to impart a color to a product. Since the $CO_2$ sequestering precipitate of the invention is inherently white in color, it is able to improve the white color of already white products, and lighten the color of those products that are not white. Exemplary non-ingestible products of the invention employing the $CO_2$ sequestering composition as a filler include eyeshadow, blush, concealer, foundation, face powder, sunscreens, suntan lotion, self tanning compositions, bronzers, baby powder, acne treatment cream, facial cleansing soap, exfoliating soap, antiperspirants, deodorants, bath soap, bath wash, shaving cream, moisturizers, anti-wrinkle cream, teeth whitening agents, lotions, anti-inch cream, anti-fungal cream, toothpaste, shampoo, conditioner, hair mousse, hair colorants, laundry detergent, dishwashing powders and room deodorizing products.

In other embodiments, the $CO_2$ sequestering composition of the invention may be employed in non-ingestible products as an opacifying agent. By "opacifying agent" is meant a substance that reduces the clear or transparent appearance of a product. The opacity of the non-ingestible product may vary depending on the particle sizes of the $CO_2$ sequestering composition. For substantially opaque materials (e.g., anti-wrinkle cream), large particle sizes may be used ($\geq 1$ micron). For compositions where a less substantial opacity is desired, small particles may be used ($\leq 0.5$ micron). Exemplary non-ingestible products of the invention employing the $CO_2$ sequestering composition as an opacifying agent include anti-wrinkle cream, bronzer, sun-tan lotion and self-tanning compositions.

In other embodiments, the $CO_2$ sequestering composition of the invention may be employed in non-ingestible products as an oral-care agent. By "oral-care agent" is meant a compound that may be used to polish teeth, reduce oral odor or otherwise cleanse or deodorize the teeth and mouth. In addition to being a mild abrasive for polishing teeth, the $CO_2$ sequestering composition, when incorporated in products used for oral hygiene, can buffer acids that facilitate tooth decay and provide a whitening component to oral-care products. Exemplary non-ingestible products of the invention employing the $CO_2$ sequestering composition as an oral-care agent include toothpaste, teeth whitening agents and mouthwash.

In other embodiments, the $CO_2$ sequestering composition of the invention may be employed in non-ingestible products as a UV-scattering agent. By "UV-scattering agent" is meant a compound that can sufficiently scatter UV light. Depending on the particle sizes of the $CO_2$ sequestering precipitate, the amount of UV light (i.e., light having wavelengths $\leq 380$ nm) that is scattered and thus unavailable for absorption may vary. In some instances, the amount of UV light scattered may be 10% or more, including 25% or more, such as 50% or more. In some embodiments of the invention, the $CO_2$ sequestering composition may be the only component used to protect against UV radiation. In other embodiments, the $CO_2$ sequestering composition may be used in combination with conventional UV absorbing compositions to protect against UV radiation. Exemplary non-ingestible products of the invention employing the $CO_2$ sequestering composition as a UV-scattering agent include sunscreen, face powder, blush and foundation.

Food, Vitamins, Nutritional Supplements, Pharmaceuticals and Other Ingestible Products The present invention also includes novel formulations which incorporate the $CO_2$ sequestering composition into ingestible products. By "ingestible" is meant compositions that are taken orally, even though they may not be digested, where ingestibles are formulated for human consumption. Ingestibles of the invention may include food products, vitamins, nutritional supplements, pharmaceuticals and mineral fortified products.

Of interest are novel ingestible formulations which incorporate the $CO_2$ sequestering composition of the invention into food products. Food products of the invention are any ingestible solids or liquids, usually composed of carbohydrates, fats, water and/or proteins that are consumed for nutrition or pleasure. In certain embodiments, the $CO_2$ sequestering composition of the invention may be employed in food products as a buffering agent, filler, anti-caking agent, colorant, emulsifier or stabilizer. Traditional buffering agents, fillers, anti-caking agents, colorants, emulsifiers and stabilizers conventionally found in food products may be substituted entirely or a certain amount removed and replaced by the $CO_2$ sequestering compositions of the present invention.

In some embodiments, the $CO_2$ sequestering composition of the invention may be employed in food products as a buffering agent. As described above, the $CO_2$ sequestering composition may act to minimize pH changes caused by any acidic or basic components traditionally used in formulations for these products or may be used to maintain a suitable pH for taste. Exemplary food products of the invention employing the $CO_2$ sequestering composition as a buffering agent include condiments, fat emulsions (e.g., salad dressings) water-based flavored drinks (e.g., energy drinks, sports drinks, electrolyte drinks), soybean products (e.g., soy sauce), processed fruits, canned fruits, processed vegetables, canned vegetables, processed meats, canned meats, beer, wine, cider, malt beverages and canned soups.

In other embodiments, the $CO_2$ sequestering composition of the invention may be employed in food products as a filler. As described above, a filler is a non-reactive, solid ingredient used to dilute other solids, or to increase the volume of a product. Exemplary food products of the invention employing the $CO_2$ sequestering composition as a filler include seasonings, dairy-based products, confectionary substances, baby food, baby formula, sweeteners, milk powders, edible casings and milk substitutes.

In other embodiments, the $CO_2$ sequestering composition of the invention may be employed in food products as an anti-caking agent. As described above, an anti-caking agent is used to prevent solid compositions from forming large aggregates (i.e., clumps) and facilitates a consistent granular or powdered composition. Exemplary food products of the invention employing the $CO_2$ sequestering composition as an anti-caking agent include milk powders, baby formula, confectionary substances, sweeteners and seasonings.

In other embodiments, the $CO_2$ sequestering composition of the invention may be employed in food products as an emulsifier. By "emulsifier" is meant a substance that forms or maintains a uniform mixture of two or more immiscible phases. In some instances, the $CO_2$ sequestering composition can be used to form a mixture of oil and water in food products. Exemplary food products of the invention employing the $CO_2$ sequestering composition as an emulsifier include fat emulsions (e.g., salad dressings), broths and condiments.

In other embodiments, the $CO_2$ sequestering composition of the invention may be employed in food products as a colorant. As described above, a colorant is a compound that is able to impart a color to a product. Since the $CO_2$ sequestering precipitate of the invention is inherently white in color, it is able to improve the white color of already white products, and lighten the color of those products that are not white. Exemplary food products of the invention employing the $CO_2$ sequestering composition as a colorant include dairy based products, milk substitutes, milk powder, sweeteners, seasonings, baby formula, dried egg products and confectionary substances.

In other embodiments, the $CO_2$ sequestering composition of the invention may be employed in food products as a stabilizer. By "stabilizer" is meant a substance that facilitates a uniform dispersion of two or more immiscible substances. Exemplary food products of the invention employing the $CO_2$ sequestering composition as a stabilizer include dairy based products, canned soups, milk substitutes, liquid whey and condiments.

Also of interest are novel ingestible formulations which incorporate the $CO_2$ sequestering composition of the invention into vitamins, nutritional supplements and pharmaceuticals. Vitamins, nutritional supplements and pharmaceuticals of the invention may include any ingestible solids or liquids that are not food products (as described above) consumed for nutritional or medicinal purposes. In certain embodiments, the $CO_2$ sequestering composition of the invention may be employed in vitamins, nutritional supplements and pharmaceuticals as buffering agents, fillers, anti-caking agents, colorants, and binders. By "binder" is meant a substance that is used to hold together ingredients of a compressed tablet or cake. Vitamins, nutritional supplements and pharmaceuticals of the invention may be in the form or a powder, syrup, liquid, tablet, capsule with powder filling, liquid-gel capsule and the like. Vitamins, nutritional supplements and pharmaceuticals may include, but are not limited to over-the-counter medications, behind-the-counter medications, prescription medications, liquid nutritional drinks, nutritional powders, weight-loss supplements, multivitamins, nutraceuticals, laxatives, antacids and the like. Traditional buffering agents, fillers, anti-caking agents, colorants and binders conventionally found in vitamins, nutritional supplements and pharmaceuticals may be substituted entirely or a certain amount removed and replaced by the $CO_2$ sequestering compositions of the present invention.

An exemplary embodiment, depending upon the components in the water and the gaseous stream used to generate the carbonate precipitate of the invention (as described in detail below) include preparing the $CO_2$ sequestering carbonate precipitate in tablet form for use as a dietary supplement or as an antacid (e.g., calcium supplement). Substantially pure calcium and magnesium carbonate precipitate provided by methods of the invention may be further processed into tablets by any convenient protocol. The $CO_2$ sequestering carbonate precipitate may also be incorporated into tablets containing multiple dietary supplements (e.g., multivitamin).

In another exemplary embodiment, the $CO_2$ sequestering composition of invention may be used for the mineral fortification of food products. By "mineral fortification" is meant the addition of minerals (e.g., calcium, magnesium) to food during production or processing. Food products of the invention may be fortified with minerals by substantially pure $CO_2$ sequestering carbonate precipitate using any convenient protocol, such as for example mixing the $CO_2$ sequestering composition with the food product. Depending on the type of food product, the amount of $CO_2$ sequestering composition added may vary, ranging from 5 mg to 1500 mg, such as 10 mg to 500 mg and including 100 mg to 200 mg. Exemplary food products that may be fortified with $CO_2$ sequestering compositions of the invention include, but are not limited to: baked goods (e.g., breads, cookies, biscuits, crackers, waffles, pancakes, cakes); bars (e.g., baked bars, breakfast bars, granola bars, energy bars); beverages (e.g., opaque beverages, both dairy and non-dairy); breakfast cereals; chewing gum; candies (e.g., opaque hard candies, chocolate, nougats, caramels, cream filled); frozen desserts (e.g., ice cream, frozen soy desserts, frozen yogurts); infant formulas; ingredient enrichment (e.g., flour, meals, grains, wheat, corn, rice, oats); liquid meals (e.g., replacement meals, special formulations for diabetic, diet or slimming drinks); milks; pastas (e.g., macaroni, spaghetti, noodles, couscous, ramen, instant noodles); powdered drink mixes (e.g., flavored milks, energy drinks, protein drinks); probiotics; soymilks; tofu; yogurts (e.g., bulk-fermented yogurts, drinkable yogurts, yogurt-based smoothies).

Animal Ingestible Products

The present invention also includes novel formulations which incorporate the $CO_2$ sequestering composition into animal ingestible products. By "animal ingestible" is meant compositions that are taken orally and are formulated for non-human (e.g., livestock, pets) consumption Animal Ingestible products of the invention may include but are not limited to animal food products, vitamins, nutritional supplements and pharmaceuticals for animal consumption. Of interest are novel animal-ingestible product formulations which employ the $CO_2$ sequestering composition of the invention as buffering agents, fillers, anti-caking agents, colorants, emulsifiers, stabilizers and binders into food products, vitamins, nutritional supplements and pharmaceuticals formulated for animal consumption. Traditional buffering agents, fillers, anti-caking agents, colorants, emulsifiers, stabilizers and binders conventionally found in animal-ingestible products may be substituted entirely or a certain amount removed and replaced by the $CO_2$ sequestering compositions of the present invention.

Agricultural Products

The present invention also includes novel formulations which incorporate the $CO_2$ sequestering composition into agricultural products. By "agricultural products" is meant any composition that is employed in cultivating land, raising crops or vegetation, farming, and feeding, breeding, and raising livestock or any other activity associated therewith. Agricultural products of the invention may be soil amendment compositions (e.g., fertilizer, remediation), pest control (fungicides, insecticides) or nutritional and/or medicinal ingestible compositions for livestock (as detailed above). The $CO_2$ sequestering composition of the invention may be added to traditional agricultural products as a supplement or entirely replace conventionally used agricultural products.

In some embodiments, the $CO_2$ sequestering composition of the invention is a soil amendment. By "soil amendment" is meant a composition that aims to improve or remediate the desired properties of soil for agricultural usage. In some instances the soil amendment is a fertilizer to supply nutrients (e.g., calcium, magnesium) to the soil. In other instances, the soil amendment is a buffering agent to reduce changes to the pH of the soil. The $CO_2$ sequestering composition of the invention may be contacted with the soil in the form of a slurry or a powder. The $CO_2$ sequestering precipitate is either mixed with water prior to being dispensed onto the surface of the soil or is dispensed as a dry powder. Contacting the composition with the soil may be achieved using any convenient protocol. It may be gravity fed or pumped through hoses, spray nozzles or fixed sprayers to uniformly apply the composition. In other instances, the $CO_2$ soil stabilization compositions of the invention may be poured from a reservoir or applied manually without the use of any industrial machinery. The composition may also be applied by releasing the composition at a depth within the soil by pumping the composition beneath the surface of the soil to be treated or by digging to a depth in the soil using conventional digging machinery and further applying the composition. The composition is then mixed into the soil. In any of the various treatments within the scope of the present invention, the soil may be mixed in situ or may be temporarily removed from the ground for mixing and then replaced. Mixing the soil with the $CO_2$ sequestering composition may be accomplished using any convenient mixing equipment (e.g., rotary mixers, cement mixers, etc.). The prepared $CO_2$-sequestering composition and soil mixture is then rotated and the entire mixture is blended in a uniform manner.

In other embodiments, the $CO_2$ sequestering composition of the invention may be incorporated into pesticides. The term "pesticide" is used in its conventional sense to mean any compound that is used to eliminate, control or inhibit the proliferation of any organism which has characteristics that are regarded as injurious or unwanted. Pesticides of the invention may include those formulations used against insects, fungi, bacteria, rodents and the like. The $CO_2$ sequestering composition may be employed in pesticides to improve the pesticide action or to aid in the application of the pesticide. For example, the $CO_2$ sequestering composition may be employed as a water absorbent or as a granulating agent. In other instances, the composition may be employed as a crop-dusting filler to facilitate the uniform distribution of the pesticide on vegetation or crops. Pesticides of the invention may be prepared using any conventional protocol with the exception that an amount of the $CO_2$ sequestering composition is added. The amount of $CO_2$ sequestering additive in the pesticide may vary, and may be 1% by weight or more, such as 3% by weight or more, including 5% by weight or more, such as 25% by weight or more. The $CO_2$ sequestrating composition may be incorporated into the pesticides during the formulation of the pesticide or may be subsequently added to the finished pesticide product. Incorporation of the composition into the pesticide may be accomplished by mixing the composition with the pesticide and rotating the mixture under agitation, vortex or sonication and blending into a uniform pesticide product.

Environmental Remediation

The $CO_2$ sequestering composition of the invention may also be employed in environmental remediation. By "environmental remediation" is meant the removal of pollution or contaminants from environmental media such as soil, groundwater, sediment or water for the general protection of human health and the environment.

In some embodiments, environmental remediation employing the $CO_2$ sequestering composition of the invention is forest soil restoration. The application of the $CO_2$ sequestering composition may be employed in forest soil restoration for neutralizing acidic soil, improving the calcium and magnesium content in soil, increasing the biological activity of organically influenced soil horizons, intensifying the nitrification process in the soil or stabilizing metal organic complexes in order to decrease or prevent heavy-metal pollution. The $CO_2$ sequestering composition of the invention may be contacted with the forest soil using any convenient protocol (as discussed above). It may be applied using devices that are gravity fed or it can be pumped through hoses, spray nozzles or fixed sprayers. The composition may also be poured from a reservoir or applied manually without the use of any industrial machinery. In some instances, the $CO_2$ sequestering composition may be dispensed from a helicopter or crop-dusting airplane.

In other embodiments, environmental remediation employing the $CO_2$ sequestering composition of the invention is the neutralization of over-acidified water. By "acidified water" is meant a large body of water (e.g., pond, lake) that has a pH below 6.5 under ambient conditions and is often lower, such as 6.0 and including 5.0. The $CO_2$ sequestering composition can be applied by any convenient protocol. In some instances, the composition is applied as a slurry or as a finely ground powder. Slurries are typically sprayed onto the water surface from boats or from stations located on the water, whereas powder is dispensed by helicopter or fixed-wing planes. The application of the $CO_2$ sequestering composition may cause increases in pH that vary ranging from 1 to 4, including 2 to 4, such as 2.5 to 3.5. The amount of the $CO_2$ sequestering composition applied to the acidified water may vary considerably (depending on the size and location of the body of water and the pH of the water) ranging from 0.1 kg to 100 kg or more, such as 1000 kg or more, including 10,000 kg or more.

Preparation of $CO_2$ Sequestering Compositions

Aspects of the invention also include methods of preparing $CO_2$ sequestering compositions. $CO_2$ sequestering compositions may be prepared by producing a $CO_2$ sequestering additive, e.g., as described above, and then preparing the composition from the component. Each of these aspects of the invention will now be described in greater detail.

A variety of different methods may be employed to prepare the $CO_2$ sequestering additive of the compositions of the invention. $CO_2$ sequestration protocols of interest include, but are not limited to, those disclosed in U.S. patent application Ser. Nos. 12/126,776, titled, "Hydraulic cements comprising carbonate compound compositions," filed 23 May 2008; 12/163,205, titled "DESALINATION METHODS AND SYSTEMS THAT INCLUDE CARBONATE COMPOUND PRECIPITATION," filed 27 Jun. 2008; and 12/486,692, titled "METHODS AND SYSTEMS FOR UTILIZING WASTE SOURCES OF METAL OXIDES" filed 17 Jun. 2009; 12/501,217, titled "PRODUCTION OF CARBONATE-CONTAINING COMPOSITIONS FROM MATERIAL COMPRISING METAL SILICATE," filed 10 Jul. 2009; and 12/557,492, titled "CO2 COMMODITY TRADING SYSTEM AND METHOD," filed 10 Sep. 2009; as well as International Application No. PCT/US08/88318, titled, "METHODS OF SEQUESTERING $CO_2$," filed 24 Dec. 2008; and PCT/US09/45722, titled "ROCK AND AGGREGATE, AND METHODS OF MAKING AND USING THE SAME," filed 29 May 2009; as well as pending U.S. Provisional Patent Application Ser. Nos. 61/081,299; 61/082,766; 61/088,347; 61/088,340; and 61/101,631; the disclosures of which are herein incorporated by reference.

$CO_2$ sequestering additives of the invention include carbonate compositions that may be produced by precipitating a calcium and/or magnesium carbonate composition from a water. The carbonate compound compositions that make up the $CO_2$ sequestering additives of the invention include may metastable carbonate compounds that may be precipitated from a water, such as a salt-water, as described in greater detail below. The carbonate compound compositions of the invention include precipitated crystalline and/or amorphous carbonate compounds.

In certain embodiments, the water from which the carbonate precipitates are produced is a saltwater. In such embodiments, the carbonate compound composition may be viewed as a saltwater derived carbonate compound composition. As used herein, "saltwater-derived carbonate compound composition" means a composition derived from saltwater and made up of one or more different carbonate crystalline and/or amorphous compounds with or without one or more hydroxide crystalline or amorphous compounds. The term "saltwater" is employed in its conventional sense to refer to a number of different types of aqueous liquids other than fresh water, where the term "saltwater" includes brackish water, sea water and brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the mineral composition of the cements of the invention is derived may be a naturally occurring source, such as a sea, ocean, lake, swamp, estuary, lagoon, etc., or a man-made source. In certain embodiments, the saltwater source of the mineral composition is seawater.

While the present invention is described primarily in terms of saltwater sources, in certain embodiments, the water employed in the invention may be a mineral rich, e.g., calcium and/or magnesium rich, freshwater source. The water employed in the process is one that includes one or more alkaline earth metals, e.g., magnesium, calcium, etc, and is another type of alkaline-earth-metal-containing water that finds use in embodiments of the invention. Waters of interest include those that include calcium in amounts ranging from 50 to 20,000 ppm, such as 100 to 10,0000 ppm and including 200 to 5000 ppm. Waters of interest include those that include magnesium in amounts ranging from 50 to 20,000 ppm, such as 200 to 10000 ppm and including 500 to 5000 ppm.

The saltwater-derived carbonate compound compositions of embodiments of the cements are ones that are derived from a saltwater. As such, they are compositions that are obtained from a saltwater in some manner, e.g., by treating a volume of a saltwater in a manner sufficient to produce the desired carbonate compound composition from the initial volume of saltwater. The carbonate compound compositions of certain embodiments are produced by precipitation from a water, e.g., a saltwater, a water that includes alkaline earth metals, such as calcium and magnesium, etc., where such waters are collectively referred to as alkaline-earth-metal-containing waters.

The saltwater employed in methods may vary. As reviewed above, saltwaters of interest include brackish water, sea water and brine, as well as other salines having a salinity that is greater than that of freshwater (which has a salinity of less than 5 ppt dissolved salts. In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds as mentioned above.

In methods of producing the carbonate compound compositions of the aggregates of the invention, a volume of water is subjected to carbonate compound precipitation conditions sufficient to produce a precipitated carbonate compound composition and a mother liquor (i.e., the part of the water that is left over after precipitation of the carbonate compound(s) from the saltwater). The resultant precipitates and mother liquor collectively make up the carbonate compound compositions of the invention. Any convenient precipitation conditions may be employed, which conditions result in the production of a carbonate compound composition sequestration product.

Precipitation conditions of interest may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitate.

In normal sea water, 93% of the dissolved $CO_2$ is in the form of bicarbonate ions ($HCO_3^-$) and 6% is in the form of carbonate ions ($CO_3^{-2}$). When calcium carbonate precipitates from normal sea water, $CO_2$ is released. In fresh water, above pH 10.33, greater than 90% of the carbonate is in the form of carbonate ion, and no $CO_2$ is released during the precipitation of calcium carbonate. In sea water this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level which minimizes if not eliminates $CO_2$ production during precipitation, causing dissolved $CO_2$, e.g., in the form of carbonate and bicarbonate, to be trapped in the carbonate compound precipitate. In these embodiments, the pH may be raised to 10 or higher, such as 11 or higher.

The pH of the water may be raised using any convenient approach. In certain embodiments, a pH raising agent may be employed, where examples of such agents include oxides, hydroxides (e.g., calcium oxide in fly ash, potassium hydroxide, sodium hydroxide, brucite ($Mg(OH_2)$, etc.), carbonates (e.g., sodium carbonate) and the like. One such approach is to use the coal ash from a coal-fired power plant, which contains many oxides, to elevate the pH of the water. Other coal processes, like the gasification of coal, to produce syngas, also produce hydrogen gas and carbon monoxide, and may serve as a source of hydroxide as well. Some naturally occurring minerals, such as serpentine, contain hydroxide, and can be dissolved, yielding a hydroxide source. The addition of serpentine, also releases silica and magnesium into the solution, leading to the formation of silica containing carbonate compounds. The amount of pH elevating agent that is added to the water will depend on the particular nature of the agent and the volume of water being modified, and will be sufficient to raise the pH of the water to the desired value. Alternatively, the pH of the water source can be raised to the desired level by electrolysis of water. Where electrolysis is employed, a variety of different protocols may be taken, such as use of the Mercury cell process (also called the Castner-Kellner process); the Diaphragm cell process and the membrane cell process. Where desired, byproducts of the hydrolysis product, e.g., $H_2$, sodium metal, etc. may be harvested and employed for other purposes, as desired. In some embodiments, described further below, HCl is a byproduct of the process and may be used, e.g. in the manufacture of poly (vinyl chloride) (PVC).

Methods of the invention include contacting a volume of an aqueous solution of divalent cations with a source of $CO_2$ (to dissolve $CO_2$) and subjecting the resultant solution to precipitation conditions. In some embodiments, a volume of an aqueous solution of divalent cations is contacted with a source of $CO_2$ (to dissolve $CO_2$) while subjecting the aqueous solution to precipitation conditions. The dissolution of $CO_2$ into the aqueous solution of divalent cations produces carbonic acid, a species in equilibrium with both bicarbonate and carbonate. In order to produce carbonate-containing precipitation material, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus Aspergillus ustus with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from sea water (e.g., $Mg(OH)_2$ such as that found in Moss Landing, Calif.); and wastes from mining processes involving leaching. For example, red mud may be used to modify pH as described in U.S. Provisional Patent Application No. 61/161,369, titled, "NEUTRALIZING INDUSTRIAL WASTES UTILIZING $CO_2$ AND A DIVALENT CATION SOLUTION", filed 18 Mar. 2009, which is hereby incorporated by reference in its entirety. Fossil fuel burning ash, cement kiln dust, and slag, collectively waste sources of metal oxides, further described in U.S. patent application Ser. No. 12/486,692, titled, "METHODS AND SYSTEMS FOR UTILIZING WASTE SOURCES OF METAL OXIDES," filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention.

Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some embodiments, electrochemical processes to remove protons do not generate a gas at the anode. In some instances, electrochemical methods to remove protons do not generate any gaseous by-byproduct. Electrochemical methods for effecting proton removal are further described in U.S. patent application Ser. No. 12/344,019, titled, "METHODS OF SEQUESTERING $CO_2$," filed 24 Dec. 2008; U.S. patent application Ser. No. 12/375,632, titled, "LOW ENERGY ELECTROCHEMICAL HYDROXIDE SYSTEM AND METHOD," filed 23 Dec. 2008; International Patent Application No. PCT/US08/088,242, titled, "LOW ENERGY ELECTROMECHANICAL HYDROXIDE SYSTEM AND METHOD," filed 23 Dec. 2008; International Patent Application No. PCT/US09/32301, titled, "LOW-ENERGY ELECTROCHEMICAL BICARBONATE ION SOLUTION," filed 28 Jan. 2009; and International Patent Application No. PCT/US09/48511, titled, "LOW-ENERGY 4-CELL ELECTROCHEMICAL SYSTEM WITH CARBON DIOXIDE GAS," filed 24 Jun. 2009, each of which are incorporated herein by reference in their entirety.

Low voltage electrochemical processes may produce hydroxide at the cathode and protons at the anode; where such processes utilize a salt containing chloride, e.g. NaCl, a product of the process will be HCl. In some embodiments of the invention, the HCL from a low-voltage electrochemical process as described herein may be used to make poly(vinyl chloride) (PVC). HCl from a low-voltage electrochemical process, e.g. a process that operates at a voltage of less than 2.0V, or less than 1.5V, or less than 1.0V, may be used in reactions well-known in the art to produce a vinyl chloride monomer. The vinyl chloride monomer may be used to produce poly(vinyl chloride) in some embodiments. In further embodiments, the PVC can be mixed with a carbonate precipitate formed by the methods described herein, e.g. a slightly wet carbonate precipitate, to form a building material. In some embodiments, the PVC/carbonate mixture may be extruded to form a slightly foamed profile, such as, e.g. a 2×4 or other lumber material. Carbonate/PVC lumber formed by such methods are thus encompassed by the invention. Such 1 umber may be $CO_2$-sequestering because the carbonate in the lumber is a $CO_2$-sequestering additive. In some embodiments, the amount of $CO_2$ sequestering additive in the formed element comprising PVC is 5 wt % or more. In some embodiments, the amount of $CO_2$ sequestering additive in the formed element comprising PVC is 10 wt % or more, 15 wt % or more, 20 wt % or more, 25 wt % or more, 30 wt % or more, 35 wt % or more, such as 40 wt % or more, 45 wt % or more, 50 wt %, 55 wt % or more, 60 wt % or more, such as up to 65 wt % or more. In some embodiments, the amount of $CO_2$ sequestering additive in the formed element comprising PVC is 60 wt % or more. In some embodiments, the PVC and $CO_2$ sequestering additive are mixed and formed in a screw extruder. In some embodiments, the formed element is injection molded. In some embodiments, the PVC is foamed to create a cellular structure that will hold anchoring devices such as nails and screws. In some embodiments, the formed element comprising PVC and $CO_2$ sequestering additive is used to fabricate building elements that are flame resistant. In some embodiments, the formed element comprising PVC and $CO_2$ sequestering additive is such that the amount of $CO_2$ sequestering additive increases the finishability, i.e. ease of cutting and sanding, of the formed element. In some embodiments, the formed element comprising PVC and $CO_2$ sequestering additive is such that the amount of $CO_2$ sequestering additive enhances the coloring or appearance of the formed element. In some embodiments, the formed element comprising PVC and $CO_2$ sequestering additive is such that the amount of $CO_2$ sequestering additive gives stiffness to the formed element. In some embodiments, the $CO_2$ sequestering additive is added to the PVC during the production of the PVC. In some such embodiments, the PVC can be derived from the $CO_2$ sequestering methods of the invention.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. patent application Ser. No. 12/503,557, titled, "$CO_2$ UTILIZATION IN ELECTROCHEMICAL SYSTEMS," filed 15 Jul. 2009 and U.S. Provisional Application No. 61/091,729, titled, "LOW ENERGY ABSORPTION OF HYDROGEN ION FROM AN ELECTROLYTE SOLUTION INTO A SOLID MATERIAL," filed 11 Sep. 2008, the disclosures of which are herein incorporated by reference.

Combinations of the above mentioned sources of proton removal may be employed. One such combination is the use of a microorganisms and electrochemical systems. Combinations of microorganisms and electrochemical systems include microbial electrolysis cells, including microbial fuel cells, and bio-electrochemically assisted microbial reactors. In such microbial electrochemical systems, microorganisms (e.g. bacteria) are grown on or very near an electrode and in the course of the metabolism of material (e.g. organic material) electrons are generated that are taken up by the electrode.

Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph. As such, a wide range of magnesium:calcium ratios can be employed, including, e.g., 100/1, 50/1, 20/1, 10/1, 5/1, 2/1, 1/1, 1/2, 1/5, 1/10, 1/20, 1/50, 1/100. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation also has a large effect on compound phase formation. The most rapid precipitation can be achieved by seeding the solution with a desired phase. Without seeding, rapid precipitation can be achieved by rapidly increasing the pH of the sea water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of salt water is contacted with a source of $CO_2$ while the volume of saltwater is being subjected to carbonate compound precipitation conditions. Embodiments of the invention include methods in which the volume of water is contacted with a source of a $CO_2$ both prior to subjecting the volume of saltwater to carbonate compound precipitation conditions and while the volume of saltwater is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that is contacted with the volume of saltwater in these embodiments may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste feed from an industrial plant. The nature of the industrial plant may vary in these embodiments, where industrial plants of interest include power plants (e.g., as described in further detail in International Application No. PCT/US08/88318, titled, "METHODS OF SEQUESTERING $CO_2$," filed 24 Dec. 2008, the disclosure of which is herein incorporated by reference), chemical processing plants, steel mills, paper mills, cement plants (e.g., as described in further detail in U.S. Provisional Application Ser. No. 61/088,340, the disclosure of which is herein incorporated by reference), and other industrial plants that produce $CO_2$ as a byproduct. By waste feed is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Exhaust gases containing NOx, SOx, VOCs, particulates and Hg would commonly incorporate these compounds along with the carbonate in the precipitated product. Particular multi-component gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

The volume of saltwater may be contacted with the $CO_2$ source using any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

The above protocol results in the production of a slurry of a $CO_2$ sequestering precipitate and a mother liquor. Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components are then separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. application Ser. No. 12/163,205; the disclosure of which is herein incorporated by reference.

In certain embodiments, following production of the $CO_2$ sequestering product, the resultant product is separated from the mother liquor to produce separated $CO_2$ sequestering product. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate.

The resultant dewatered precipitate may then be dried, as desired, to produce a dried product. Drying can be achieved by air drying the wet precipitate. Where the wet precipitate is air dried, air drying may be at room or elevated temperature. In yet another embodiment, the wet precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. Where desired, the dewatered precipitate product may be washed before drying. The precipitate may be washed with freshwater, e.g., to remove salts (such as NaCl) from the dewatered precipitate.

In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

FIG. 1 provides a schematic flow diagram of a process for producing a $CO_2$ sequestering product according to an embodiment of the invention. In FIG. 1, saltwater from salt water source 10 is subjected to carbonate compound precipitation conditions at precipitation step 20. As reviewed above, term "saltwater" is employed in its conventional sense to refer a number of different types of aqueous fluids other than fresh water, where the term "saltwater" includes brackish water, sea water and brine (including man-made brines, e.g., geothermal plant wastewaters, desalination waste waters, etc), as well as other salines having a salinity that is greater than that of freshwater. The saltwater source from which the carbonate compound composition of the cements of the invention is derived may be a naturally occurring source, such as a sea, ocean, lake, swamp, estuary, lagoon, etc., or a man-made source.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In the embodiment depicted in FIG. 1, the water from saltwater source 10 is first charged with $CO_2$ to produce $CO_2$ charged water, which $CO_2$ is then subjected to carbonate compound precipitation conditions. As depicted in FIG. 1, a $CO_2$ gaseous stream 30 is contacted with the water at precipitation step 20. The provided gaseous stream 30 is contacted with a suitable water at precipitation step 20 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the "$CO_2$ content" of the water, e.g., in the form of carbonic acid, bicarbonate and carbonate ion, and a concomitant decrease in the $pCO_2$ of the waste stream that is contacted with the water. The $CO_2$ charged water is acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

At precipitation step 20, carbonate compounds, which may be amorphous or crystalline, are precipitated. Precipitation conditions of interest include those that change the physical environment of the water to produce the desired precipitate product. For example, the temperature of the water may be raised to an amount suitable for precipitation of the desired carbonate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc. While the pH of the water may range from 7 to 14 during a given precipitation process, in certain embodiments the pH is raised to alkaline levels in order to drive the precipitation of carbonate compound as desired. In certain of these embodiments, the pH is raised to a level which minimizes if not eliminates $CO_2$ gas generation production during precipitation. In these embodiments, the pH may be raised to 10 or higher, such as 11 or higher. Where desired, the pH of the water is raised using any convenient approach. In certain embodiments, a pH raising agent may be employed, where examples of such agents include oxides, hydroxides (e.g., sodium hydroxide, potassium hydroxide, brucite), carbonates (e.g. sodium carbonate) and the like. The amount of pH elevating agent that is added to the saltwater source will depend on the particular nature of the agent and the volume of saltwater being modified, and will be sufficient to raise the pH of the salt water source to the desired value. Alternatively, the pH of the saltwater source can be raised to the desired level by electrolysis of the water.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

Following production of the carbonate precipitate from the water, the resultant precipitated carbonate compound composition is separated from the mother liquor to produce separated carbonate compound precipitate product, as illustrated at step 40 of FIG. 1. Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, etc. Separation of bulk water produces a wet, dewatered precipitate.

The resultant dewatered precipitate is then dried to produce a product, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc.

At step 70, the dried precipitate is refined, e.g., to provide for desired physical characteristics, such as particle size, surface area, etc., or to add one or more components to the precipitate, such as admixtures, aggregate, supplementary cementitious materials, etc., to produce a final product 80.

In certain embodiments, a system is employed to perform the above methods.

Following production of the $CO_2$ sequestering component, e.g., as described above, the $CO_2$ sequestering is then employed to produce a non-cementitious composition of the invention, e.g., as described above.

Utility

Compositions of the invention find use in a variety of different applications, as reviewed above. The subject methods and systems find use in $CO_2$ sequestration, particularly via sequestration in a variety of diverse man-made products. By "sequestering $CO_2$" is meant the removal or segregation of $CO_2$ from a gaseous stream, such as a gaseous waste stream, and fixating it into a stable non-gaseous form so that the $CO_2$ cannot escape into the atmosphere. By "$CO_2$ sequestration" is meant the placement of $CO_2$ into a storage stable form, where the $CO_2$ is fixed at least during the useful life of the composition. As such, sequestering of $CO_2$ according to methods of the invention results in prevention of $CO_2$ gas from entering the atmosphere and long term storage of $CO_2$ in a manner that $CO_2$ does not become part of the atmosphere.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A non-cementitious composition comprising poly(vinyl chloride) (PVC) and a $CO_2$-sequestering additive, wherein the $CO_2$-sequestering additive
   i) comprises at least 80% of a carbonate compound composition that comprises a mineral selected from the group consisting of aragonite, vaterite, amorphous calcium carbonate, nesquehonite, amorphous magnesium carbonate, and combinations thereof;
   ii) comprises a salt-water source identifier selected from the group consisting of strontium, potassium, and bromide; and
   iii) has a $\delta^{13}C$ value less than −10‰.

2. The non-cementitious composition according to claim 1, wherein the carbonate compound composition comprises a precipitate from an alkaline-earth metal-containing water.

3. The non-cementitious composition according to claim 2, wherein the alkaline-earth metal-containing water comprises $CO_2$ derived from an industrial waste stream.

4. The non-cementitious composition of claim 1, wherein the amount of the $CO_2$ sequestering additive in the composition is 35 wt % or more.

5. The non-cementitious composition of claim 1, wherein the PVC is foamed.

6. The non-cementitious composition of claim 1, wherein the non-cementitious composition is formed into a carbonate/PVC lumber material, wherein said carbonate/PVC lumber material is $CO_2$ sequestering.

7. The non-cementitious composition of claim 6, wherein the $CO_2$ sequestering additive increases the finishability or stiffness or both finishability and stiffness of the carbonate/PVC lumber material.

8. The non-cementitious composition of claim 6, wherein the $CO_2$ sequestering additive enhances the coloring or appearance of the carbonate/PVC lumber material.

9. The non-cementitious composition of claim 1, wherein the $CO_2$-sequestering additive is added to the PVC during the production of the PVC.

* * * * *

UNITED STATES PATENT AND TRADEMARK OFFICE
CERTIFICATE OF CORRECTION

PATENT NO.       : 7,829,053 B2
APPLICATION NO.  : 12/609491
DATED            : November 9, 2010
INVENTOR(S)      : Brent Constantz et al.

It is certified that error appears in the above-identified patent and that said Letters Patent is hereby corrected as shown below:

Page 1, Inventors, "; Joshua Patterson, Freedom, CA (US)" should be removed.

Column 6, lines 22 to 24, each instance of "%" should be -- ‰ --.

Column 7, line 1, "lanfordite" should read --lansfordite--.

Column 7, lines 5 to 6, "($Ca_2Mg_{11}(CO_3)_{13} \cdot H_2O$)" should read --($Ca_2Mg_{11}(CO_3)_{13} \cdot 10H_2O$)--.

Column 8, lines 24 to 59, each instance of "%" should be -- ‰ --.

Column 8, line 66, "%" should be -- ‰ --.

Column 9, line 3, "%" should be -- ‰ --.

Column 10, line 3, each instance of "%" should be -- ‰ --.

Column 10, line 14, "%" should be -- ‰ --.

Column 10, line 18, "%" should be -- ‰ --.

Column 10, lines 25 to 37, each instance of "%" should be -- ‰ --.

Column 32, line 32, "HCL" should be --HCl--.

Column 39, line 28, "less than -10%." should be -- less than -10‰. --.

Signed and Sealed this
Third Day of May, 2011

David J. Kappos
*Director of the United States Patent and Trademark Office*